United States Patent [19]

Hayashi et al.

[11] Patent Number: 5,253,730
[45] Date of Patent: Oct. 19, 1993

[54] POWER STEERING APPARATUS

[75] Inventors: Kiyotaka Hayashi; Kazushiro Inoue, both of Saitama; Tatsuhiro Tomari, Tokyo; Kanau Iwashita, Saitama; Shoichi Honda, Tokyo, all of Japan

[73] Assignee: Honda Giken Kogyo Kabushiki Kaisha, Tokyo, Japan

[21] Appl. No.: 789,523

[22] Filed: Nov. 7, 1991

Related U.S. Application Data

[63] Continuation of Ser. No. 362,259, Jun. 6, 1989, abandoned.

[30] Foreign Application Priority Data

Jun. 8, 1988 [JP] Japan .................. 63-140950
Sep. 12, 1988 [JP] Japan .................. 63-227932

[51] Int. Cl.$^5$ ............................. B62D 5/06
[52] U.S. Cl. ...................... 180/146; 180/132; 180/157; 180/158
[58] Field of Search ............... 180/132, 141, 146, 147, 180/148, 151, 157, 158, 162, 163, 142, 143; 74/388 PS; 418/171

[56] References Cited

U.S. PATENT DOCUMENTS

| | | | |
|---|---|---|---|
| 1,910,600 | 5/1933 | Fitch | 180/151 |
| 2,865,462 | 12/1958 | Milliken et al. | 180/157 |
| 3,291,245 | 12/1966 | Hewko | 180/157 |
| 3,465,842 | 9/1969 | Hruska | 180/157 |
| 3,905,439 | 9/1975 | Miura | 180/155 |
| 3,986,578 | 10/1976 | Chanal | 180/158 |
| 4,274,504 | 6/1981 | Kawabat et al. | 180/143 |
| 4,718,514 | 1/1988 | Hirakushi | 180/141 |
| 4,881,612 | 11/1989 | Yano et al. | 180/132 |

FOREIGN PATENT DOCUMENTS

| | | | |
|---|---|---|---|
| 0230212 | 9/1960 | Australia | 180/158 |
| 49-23172 | 6/1974 | Japan . | |
| 62-46788 | 2/1987 | Japan . | |
| 0802937 | 10/1958 | United Kingdom | 180/158 |

*Primary Examiner*—Karin L. Tyson
*Assistant Examiner*—Anne Marie Boehler
*Attorney, Agent, or Firm*—Rosen, Dainow & Jacobs

[57] ABSTRACT

A power steering apparatus on a motor vehicle such as a riding-type four-wheel motor vehicle includes a steering shaft with at least a steering handle mounted on an upper portion thereof, a lever arm arrangement angularly movable about the axis of the steering shaft, and an actuator arrangement for relatively acting on the steering shaft depending on a change in the arm ratio of the lever arm arrangement to assist in turning the steering shaft.

15 Claims, 27 Drawing Sheets

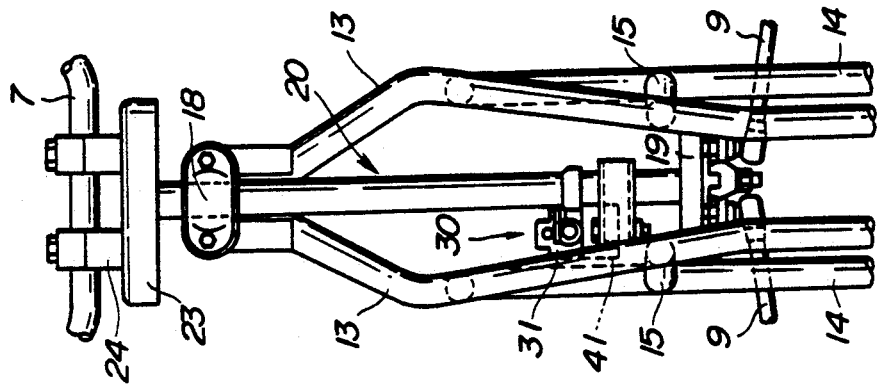
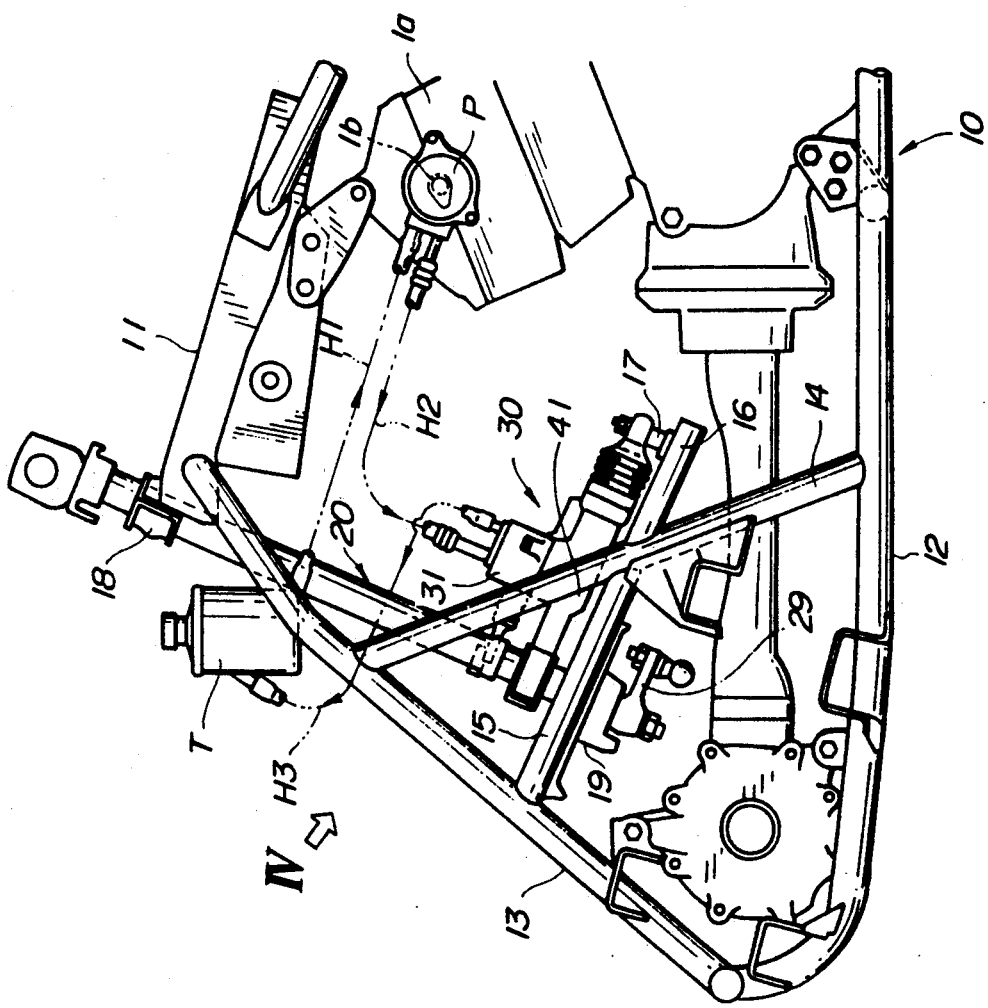

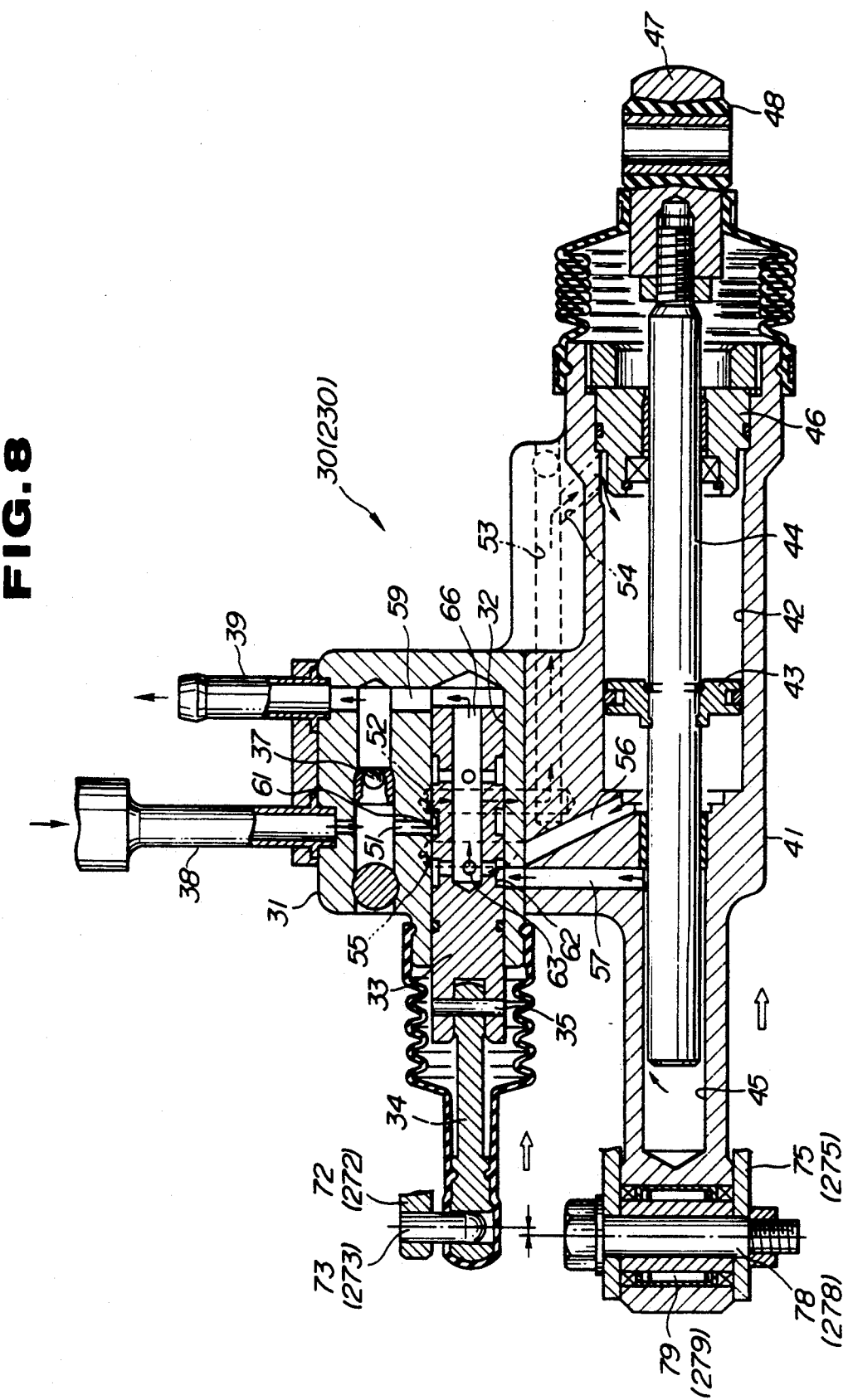

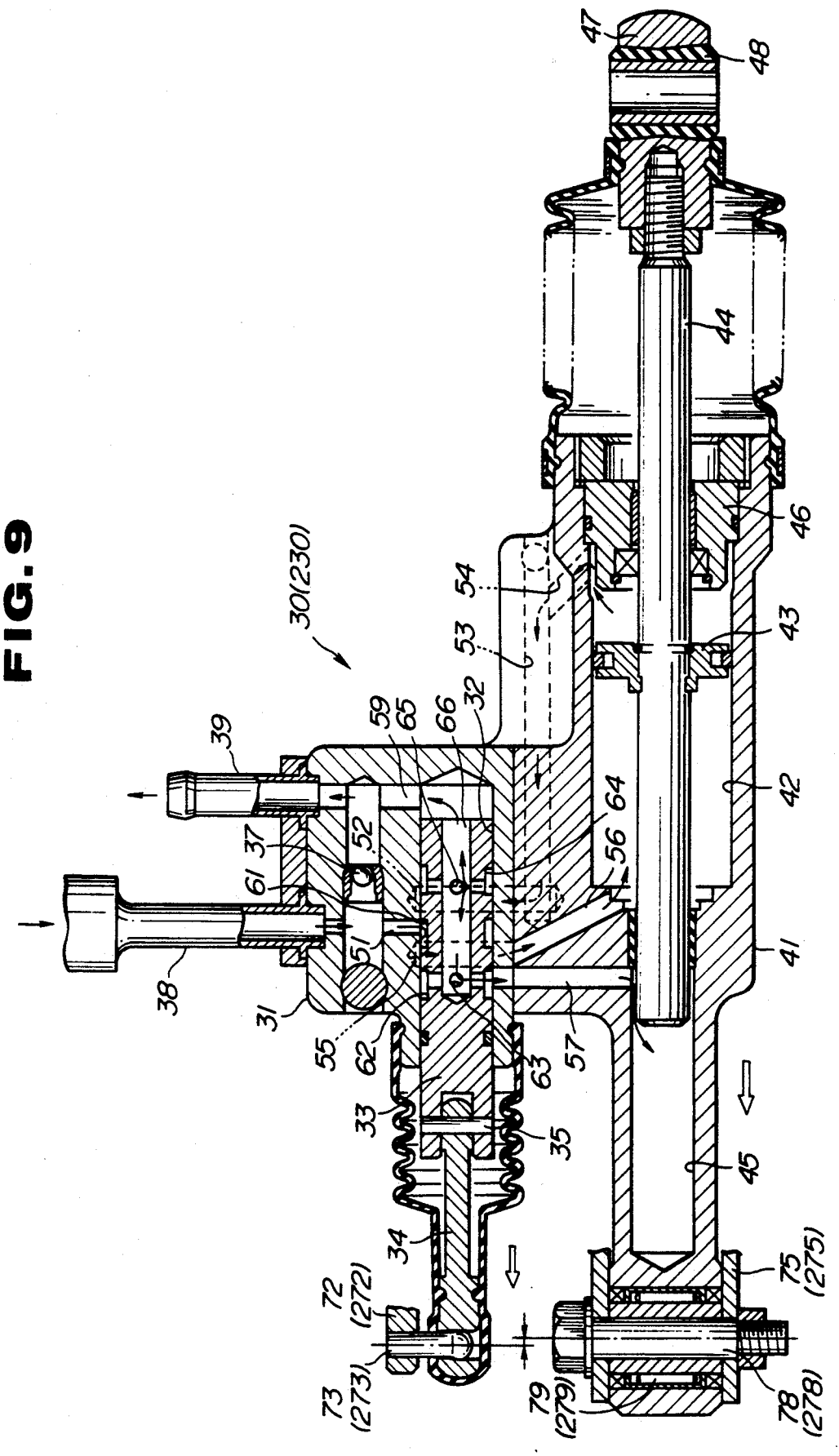

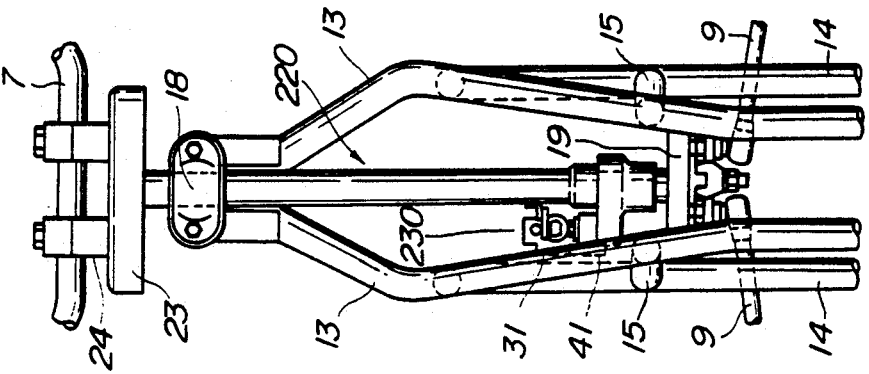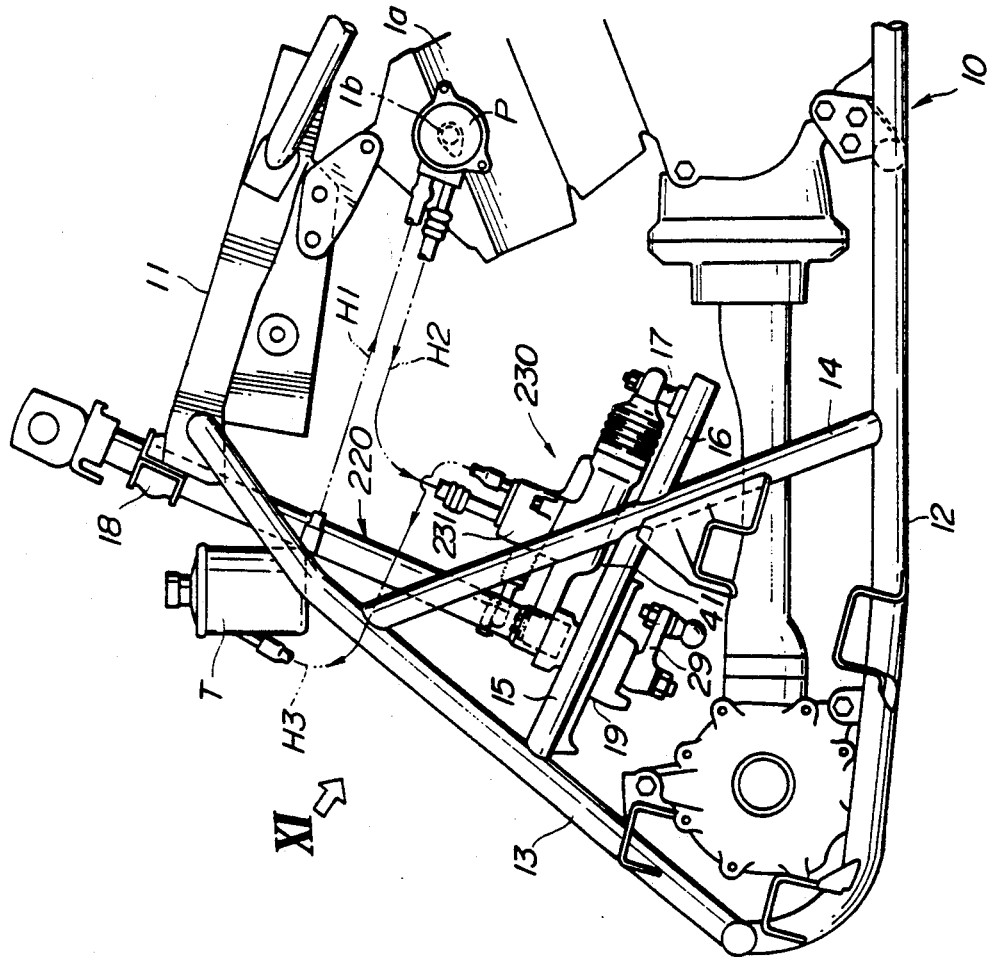

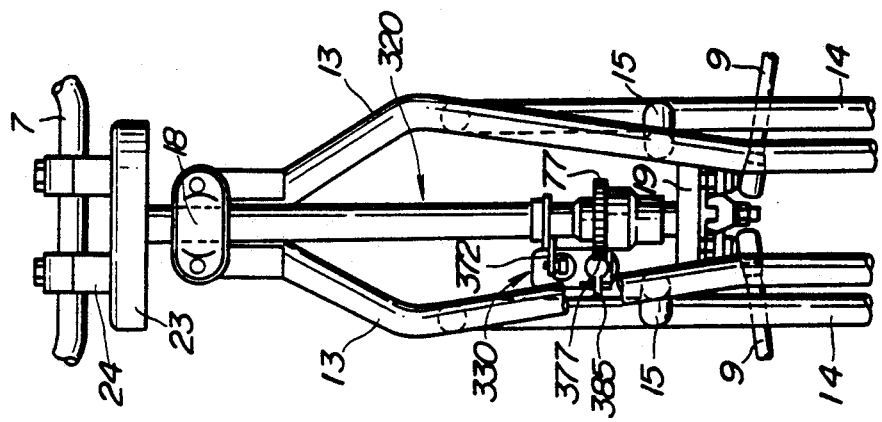
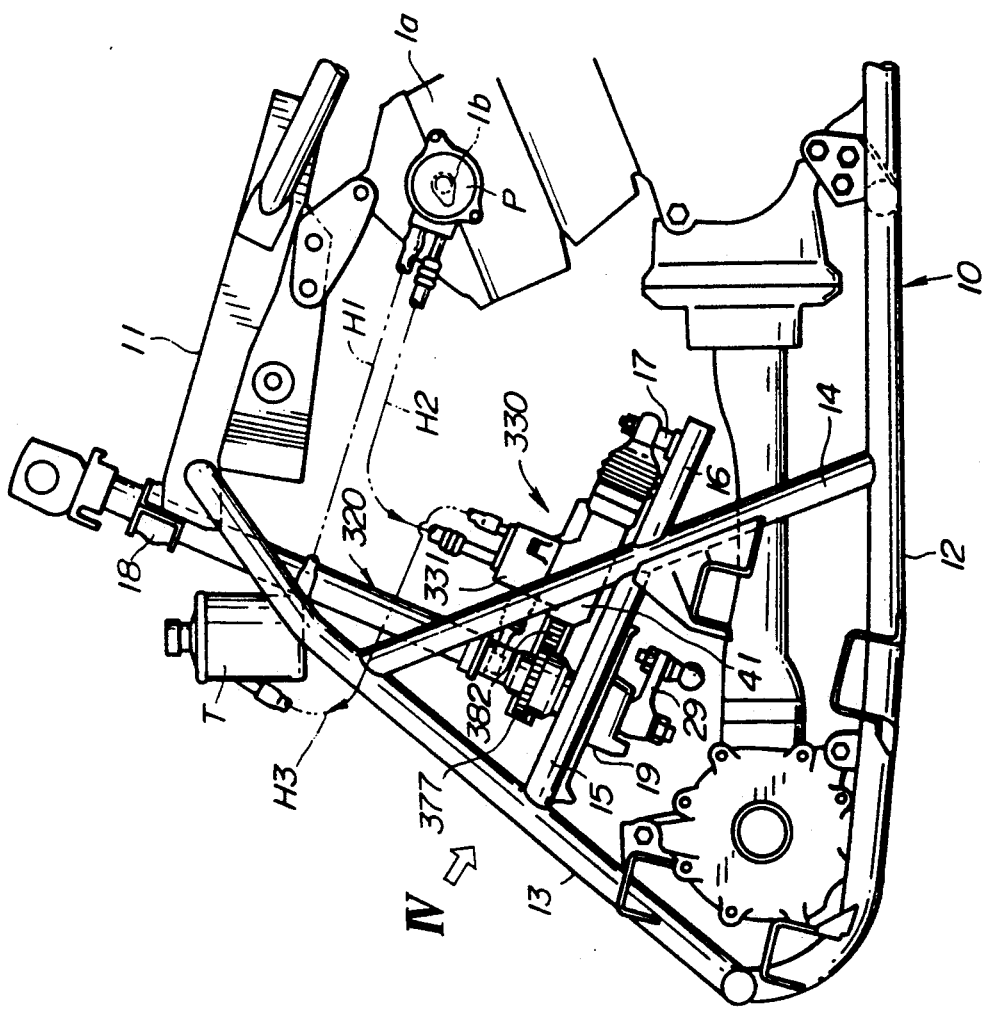

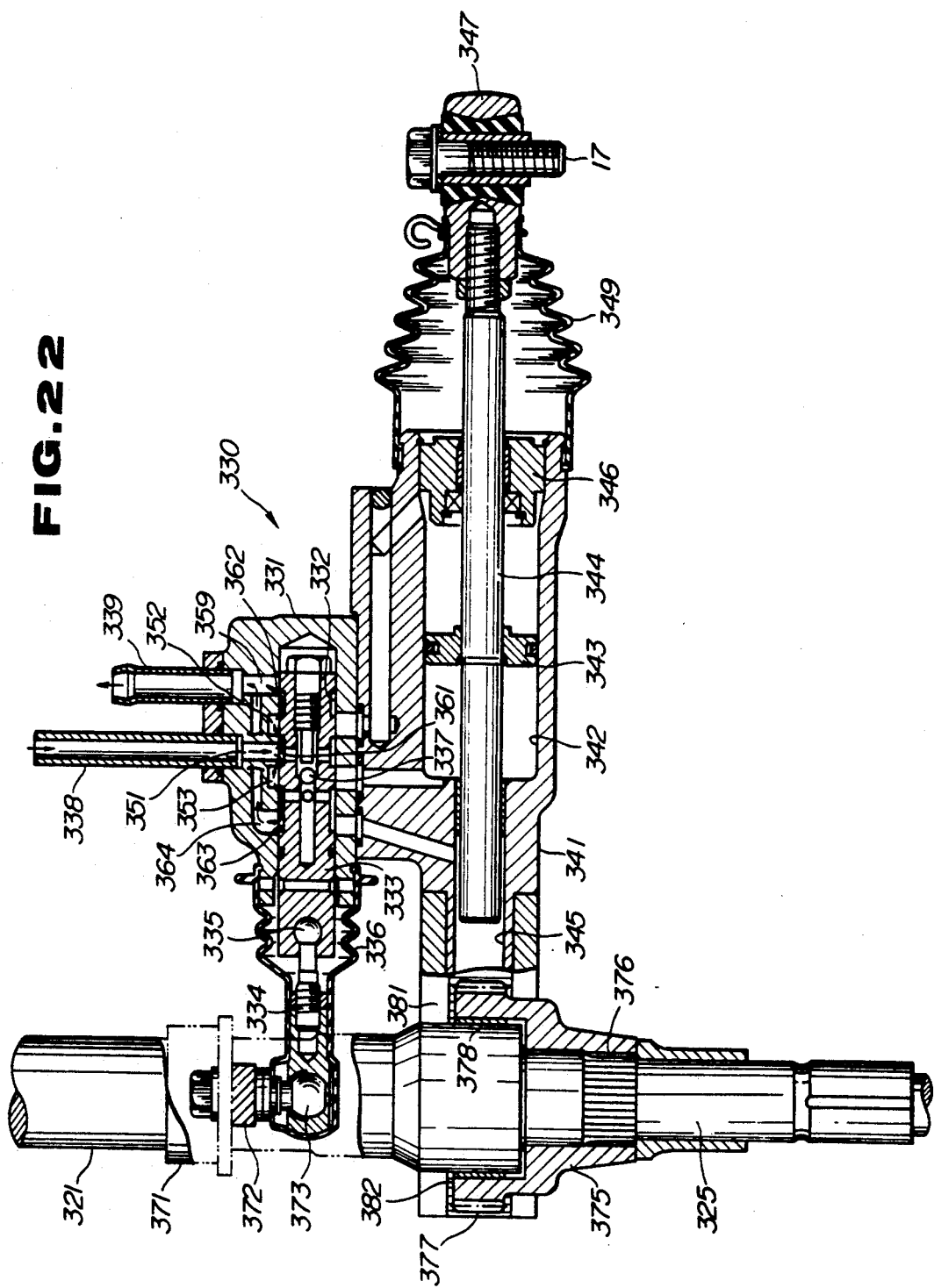

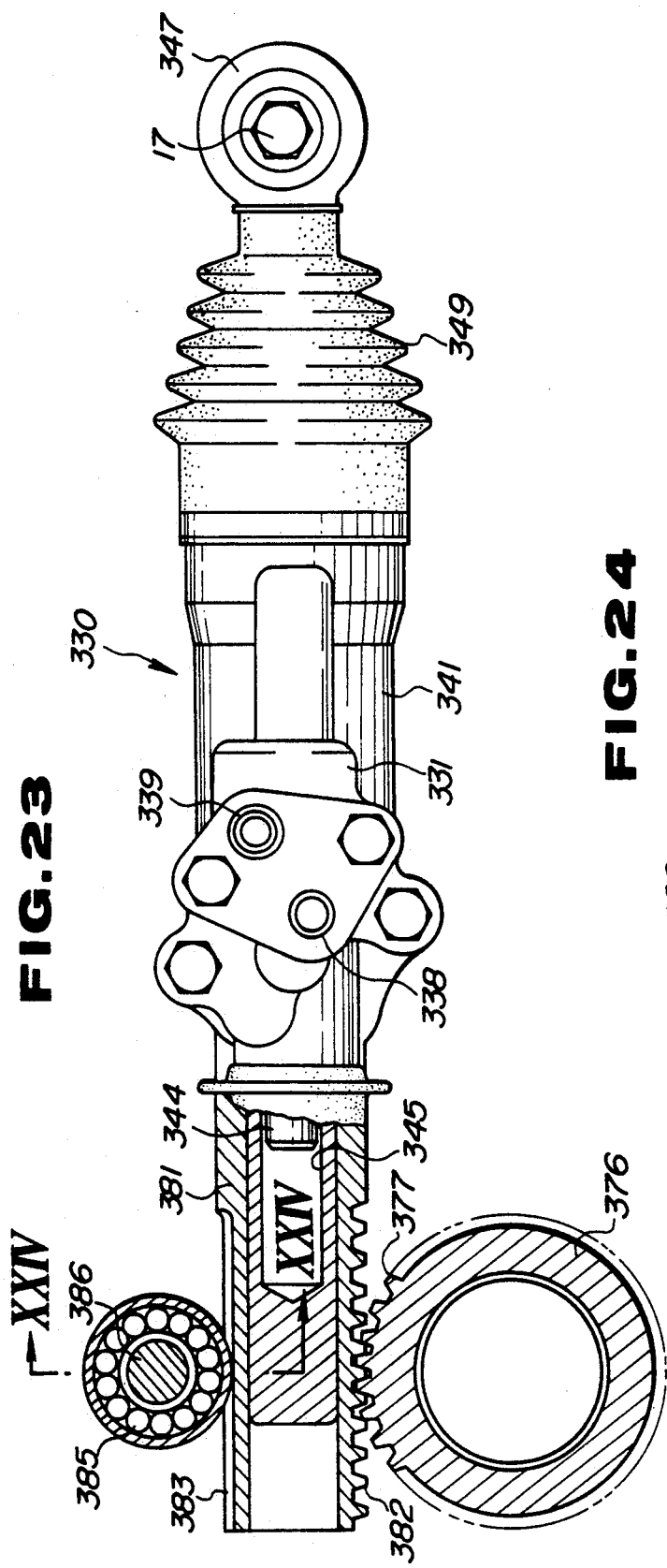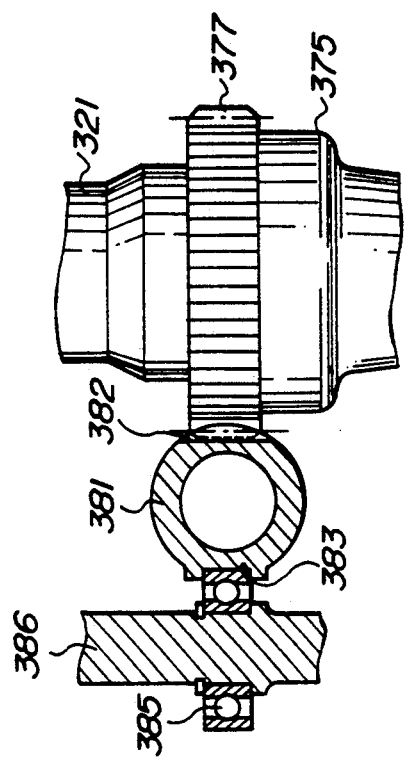

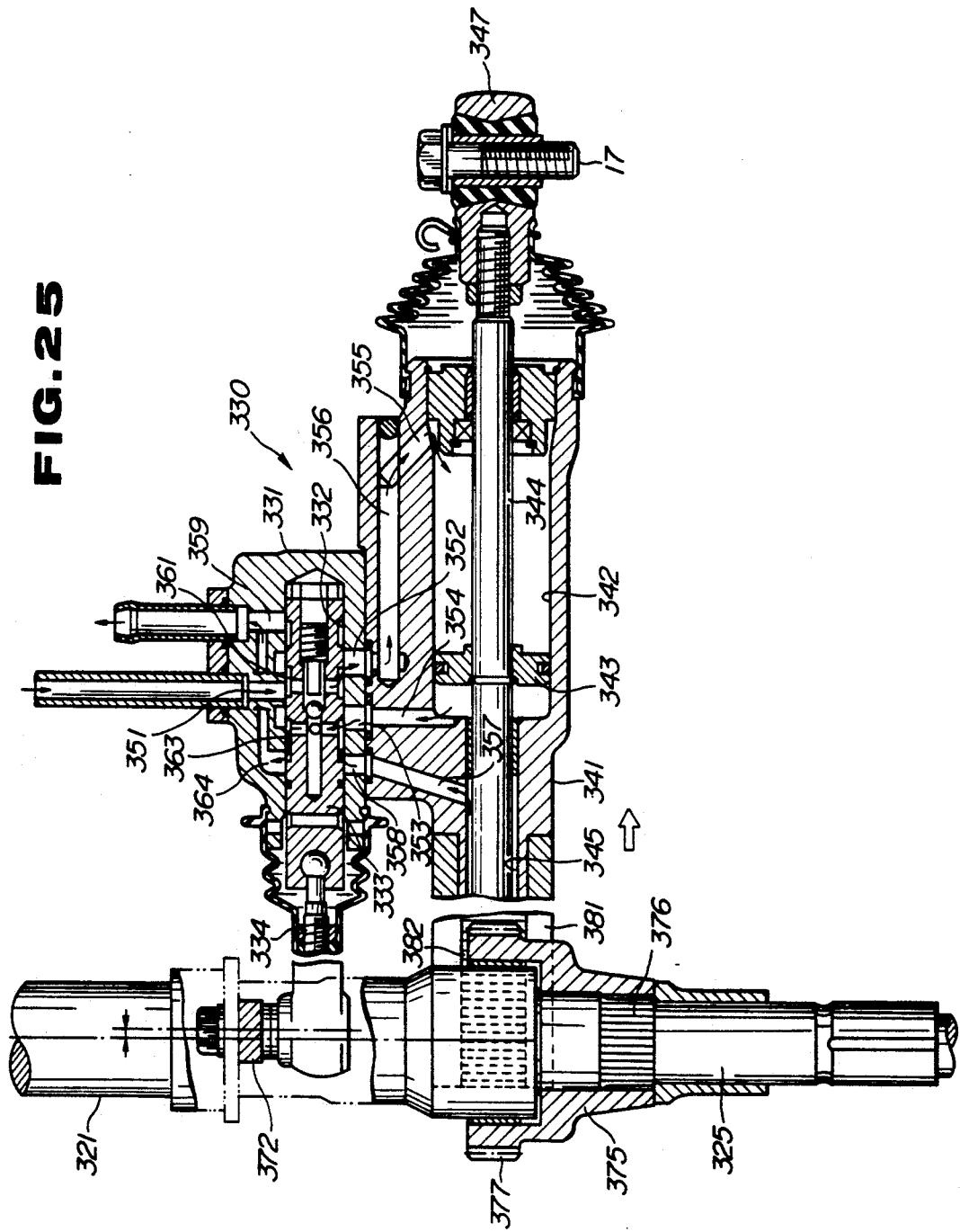

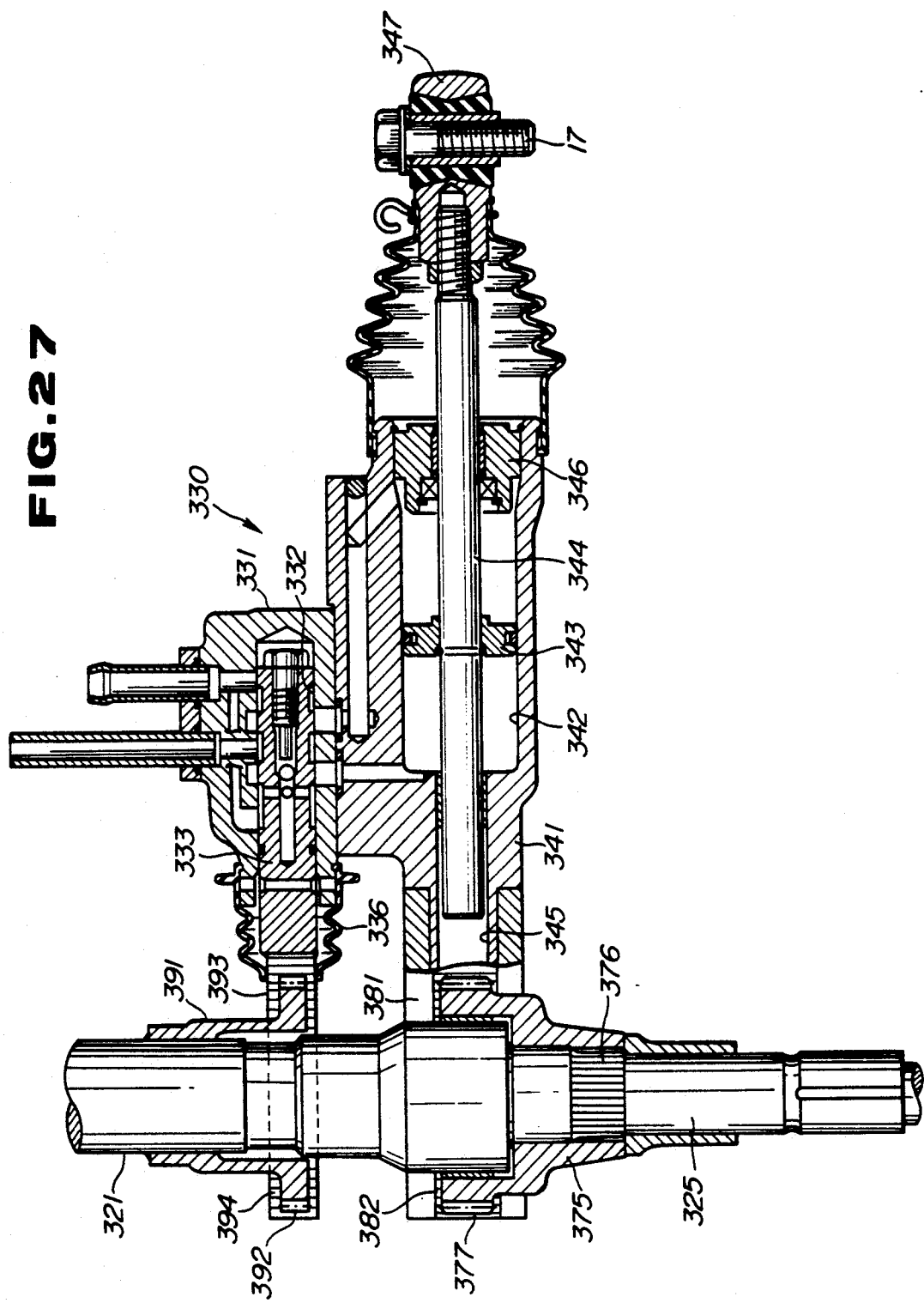

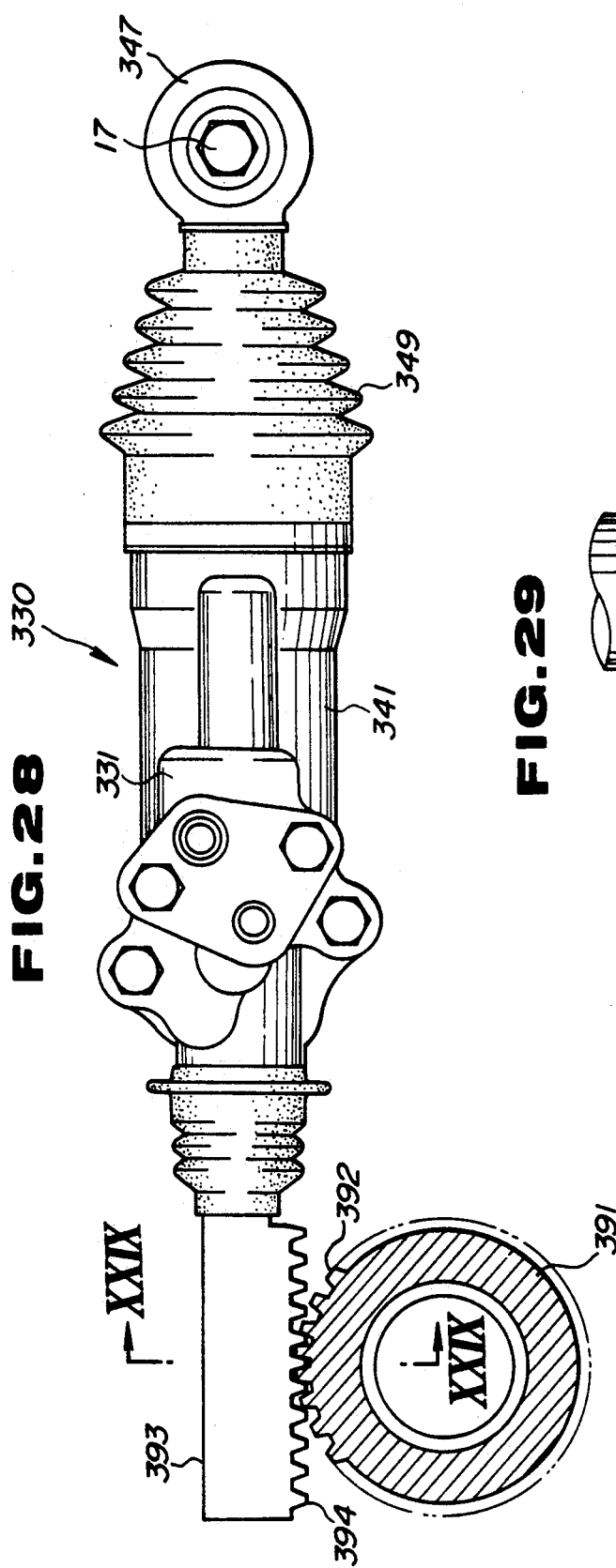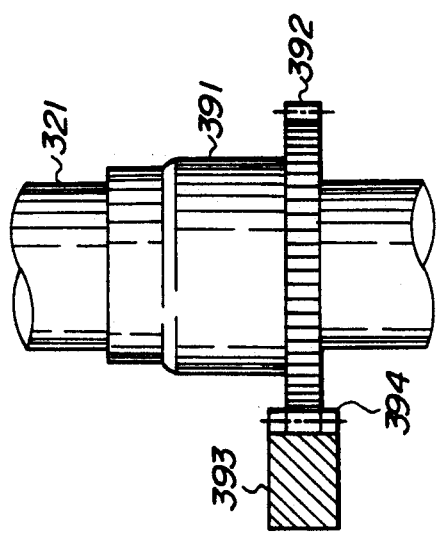

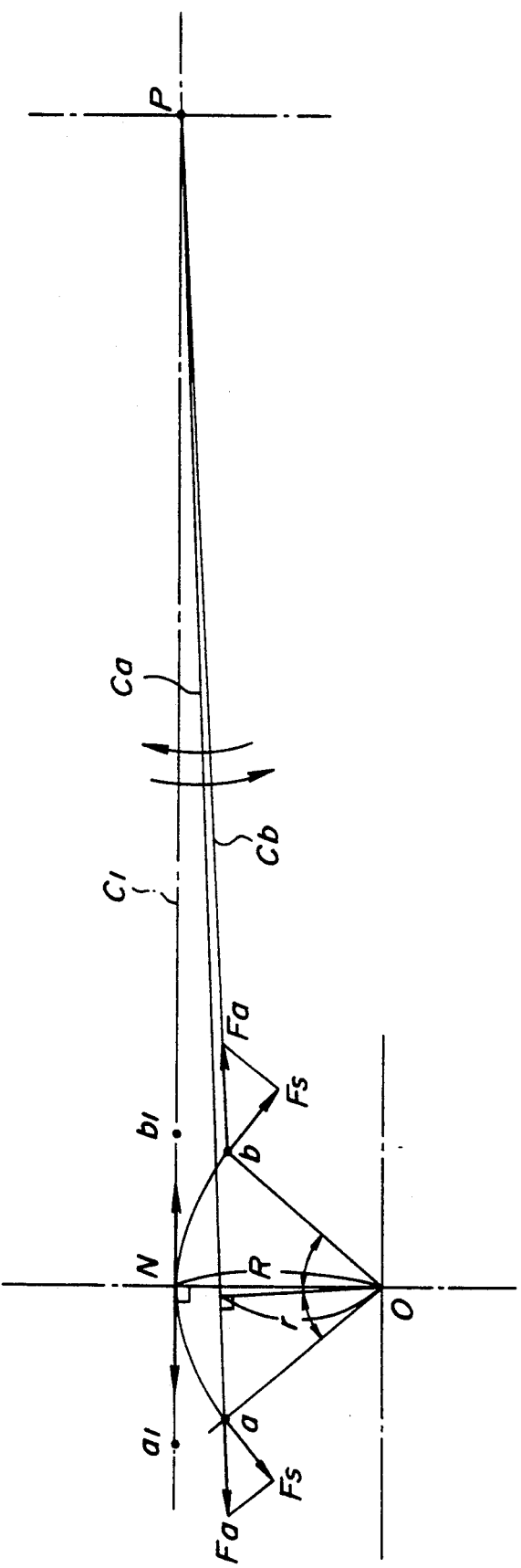

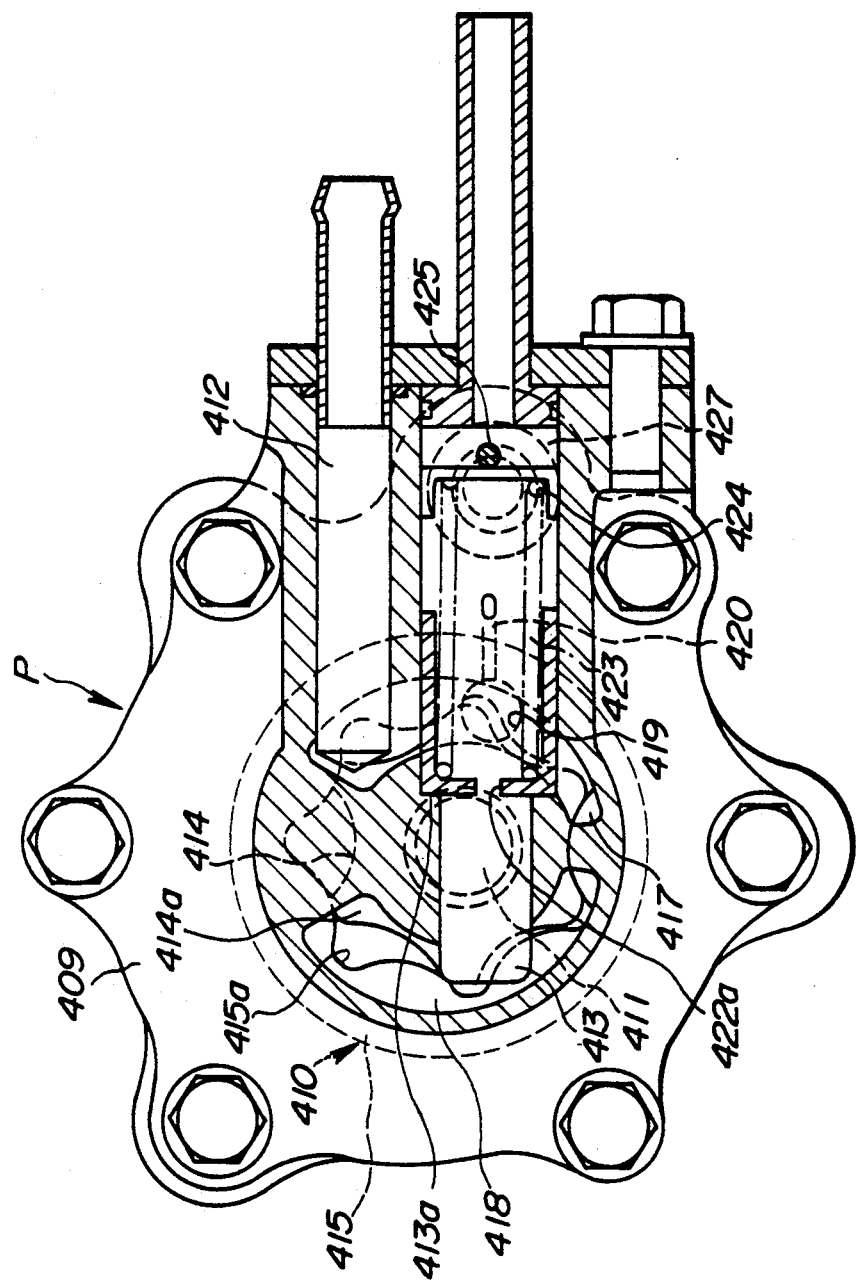

POWER STEERING APPARATUS

This application is a continuation of application Ser. No. 07/362,259, filed Jun. 6, 1989, now abandoned.

BACKGROUND OF THE INVENTION

1. Field of the Invention:

The present invention relates to a power steering apparatus, and more particularly to a power steering apparatus having a hydraulically operated power assisting actuator mounted on a vehicle frame separately from a steering shaft.

2. Description of the Relevant Art:

There is known a hydraulically operated power steering apparatus without any gear mechanism employed, as disclosed in Japanese Patent Publication No. 49-23172, for example. The disclosed power steering apparatus includes a steering shaft divided into an input shaft and an output shaft which are interconnected by a torsion bar that allows the input and output shafts to rotate through different angles. The power steering apparatus also has a control valve interposed between the input and output shafts, and a power assisting cylinder and piston and a swash plate mechanism which are disposed around the output shaft.

The hydraulically operated power steering apparatus of the above construction is simple in appearance, but complex in structure since the control valve is disposed in the steering shaft, and the power assisting cylinder and piston and the swash plate mechanism are positioned around the steering shaft.

SUMMARY OF THE INVENTION

In view of the aforesaid drawbacks of the conventional power steering apparatus, it is an object of the present invention to provide a hydraulically operated power steering apparatus including a control valve and a power cylinder which are not incorporated in a steering shaft but positioned as an actuator separately from the steering shaft, the actuator being compact in combination with a simple input/output mechanism for efficiently utilizing engine power, the hydraulically operated power steering apparatus being simple in structure and suitable for use on a riding-type motor vehicle with a rider's saddle.

According to the present invention, a power steering apparatus on a motor vehicle includes a steering shaft with at least a steering handle mounted on an upper portion thereof, lever arm means angularly movable about the axis of the steering shaft, and actuator means for relatively acting on the steering shaft depending on a change in the arm ratio of the lever arm means to assist in turning the steering shaft.

A pump for supplying working oil to the actuator means may comprise a trochoid pump drivable by an engine of the motor vehicle. When the rate of working oil discharged from the pump is small at the time the engine is idling, the working oil is delivered directly from an output passage to an inlet passage, thereby reducing the load on the engine and the power loss of the engine during idling operation, and stabilizing the idling speed of the engine.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a fragmentary side elevational view of a front portion of the vehicle frame of the riding-type four-wheel motor vehicle of FIG. 1, showing the layout of a steering shaft, an actuator, etc. in a power steering apparatus according to a first embodiment of the present invention;

FIG. 4 is a front elevational view as viewed in the direction indicated by the arrow IV in FIG. 3;

FIG. 8 is an enlarged vertical cross-sectional view of the actuator of the first embodiment at the time the steering handle is turned to the right;

FIG. 9 is an enlarged vertical cross-sectional view of the actuator of the first embodiment at the time the steering handle is turned to the left;

FIG. 10 is a fragmentary side elevational view of a front portion of the vehicle frame of the riding-type four-wheel motor vehicle of FIG. 1, showing the layout of a steering shaft, an actuator, etc. in a power steering apparatus according to a second embodiment of the present invention;

FIG. 11 is a front elevational view as viewed in the direction indicated by the arrow XI in FIG. 10;

FIG. 16 is a fragmentary side elevational view of a front portion of the vehicle frame of the riding-type four-wheel motor vehicle of FIG. 1, showing the layout of a steering shaft, an actuator, etc. in a power steering apparatus according to a third embodiment of the present invention;

FIG. 17 is a front elevational view as viewed in the direction indicated by the arrow XVII in FIG. 16;

FIG. 22 is an enlarged vertical cross-sectional view of the actuator of the third embodiment when the motor vehicle runs straight ahead;

FIG. 23 is a plan view, partly in cross section, of a rack and pinion mechanism on the steering shaft and a cylinder body of the actuator according to the third embodiment;

FIG. 24 is a cross-sectional view taken along line XXIV—XXIV of FIG. 23;

FIG. 25 is an enlarged vertical cross-sectional view of the actuator when the steering handle is turned to the right;

FIG. 27 is an enlarged vertical cross-sectional view of a power steering apparatus according to a modification of the third embodiment, the power steering apparatus including a rack and pinion mechanism on the steering shaft and a spool valve of the actuator;

FIG. 28 is a plan view, partly in cross section, of the power steering apparatus shown in FIG. 27;

FIG. 29 is a cross-sectional view taken along line XXIX—XXIX of FIG. 28;

FIG. 30 is a diagram illustrating the path of movement of the junction between the steering shaft and the actuator in accordance with the third embodiment;

FIG. 33 is a cross-sectional view taken along line XXXIII—XXXIII of FIG. 32;

DETAILED DESCRIPTION OF THE PREFERRED EMBODIMENTS

Figure 1:
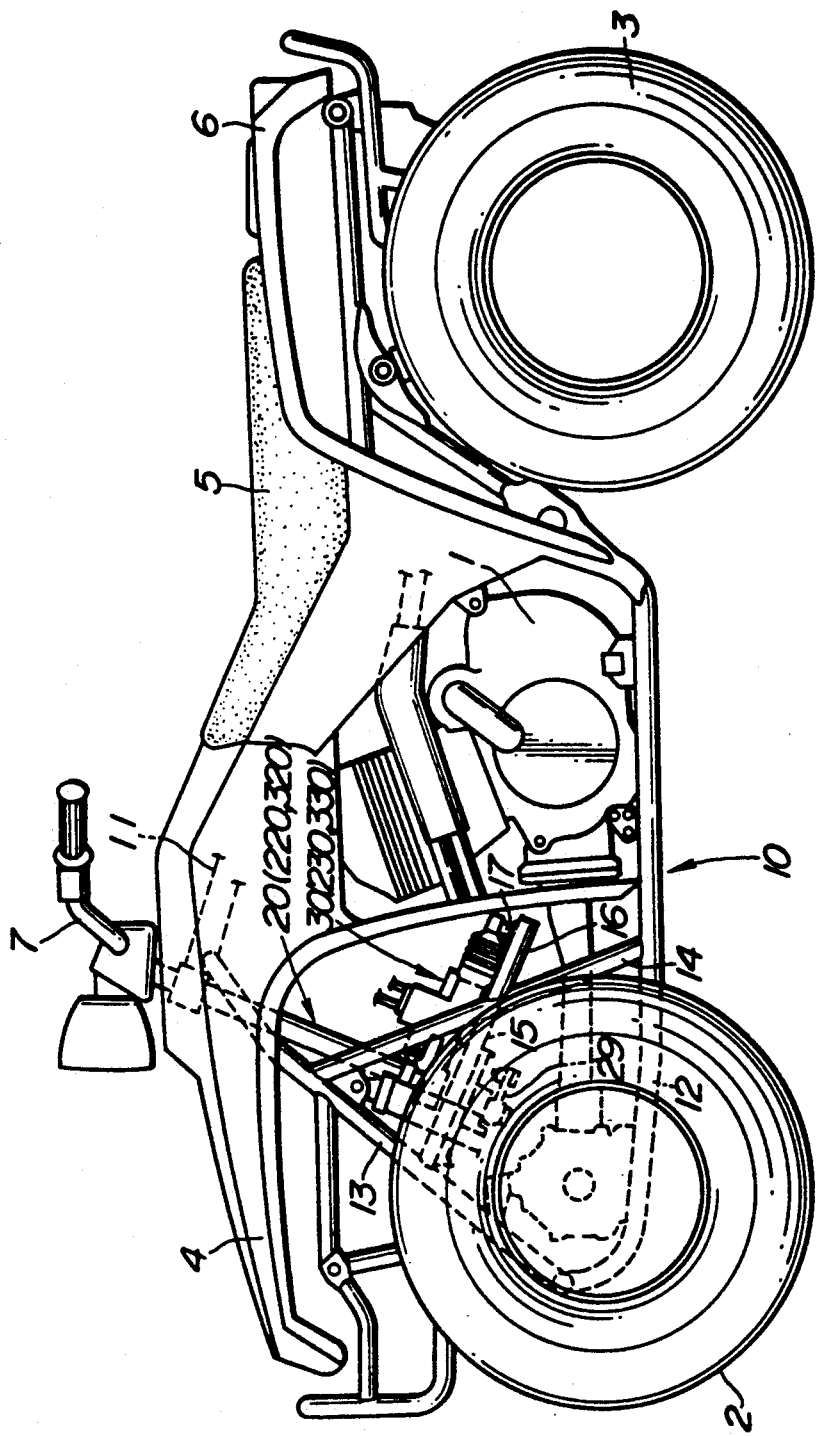
FIG. 1 is a side elevational view of a riding-type four-wheel motor vehicle incorporating a power steering apparatus according to the present invention.

FIG. 1 shows a riding-type four-wheel motor vehicle with a rider's saddle, which incorporates therein a power steering apparatus according to the present invention. The riding-type motor vehicle comprises an engine 1 mounted centrally in a vehicle frame 10, a pair of front wheels 2 and a pair of rear wheels 3 which are supported on the vehicle frame 10 by means of respective suspensions at front and rear positions and have respective low-pressure tires (see also FIG. 2), a front fender 4, a rider's saddle or seat 5 supported on the vehicle frame 10 disposed obliquely upwardly and rearwardly of the engine 1, a rear fender 6, and a steering shaft 20. The power of the engine 1 is transmitted to the front wheels 2 and the rear wheels 3. The rider rides astride the seat 5 and grips a handlebar 7 disposed above the front fender 4 which covers a front portion of the vehicle frame. The handlebar 7 is fixed to the upper end of the steering shaft 20 which has a lower portion coupled to an actuator 30 (described later on). A steering arm 29 is secured to the lower end of the steering shaft 20 and connected through tie rods 9 (FIG. 2) to respective knuckle arms 8 supporting the front wheels 2.

A steering force applied through the handlebar 7 to the steering shaft 20 is transmitted to the tie rods 9 through the steering arm 29. The power steering apparatus of the present invention is effective in reducing the steering force which becomes greater as the tires of the front wheels 2 become larger in diameter or width.

A power steering apparatus according to a first embodiment of the present invention will be described below.

As illustrated in FIGS. 3 and 4, the vehicle frame 10 has a front framework which is constructed of a pair of main pipes 11, a pair of lower pipes 12, a pair of front pipes 13, a pair of front cushion pipes 14, and a pair of lower steering shaft supporting pipes 15. The actuator 30 of the invention is disposed within the front framework of the vehicle frame 10. The steering shaft 20 has an upper portion supported on a holder 18 mounted on the front ends of the main pipes 11 and a lower portion supported on a bracket 19 extending between and attached to the lower steering shaft supporting pipes 15. The actuator 30 has a rear portion pivotally supported by a vertical shaft 17 on a pipe end 16 extending rearwardly from the righthand pipe 15 in the longitudinal direction of the motor vehicle.

Figure 5:
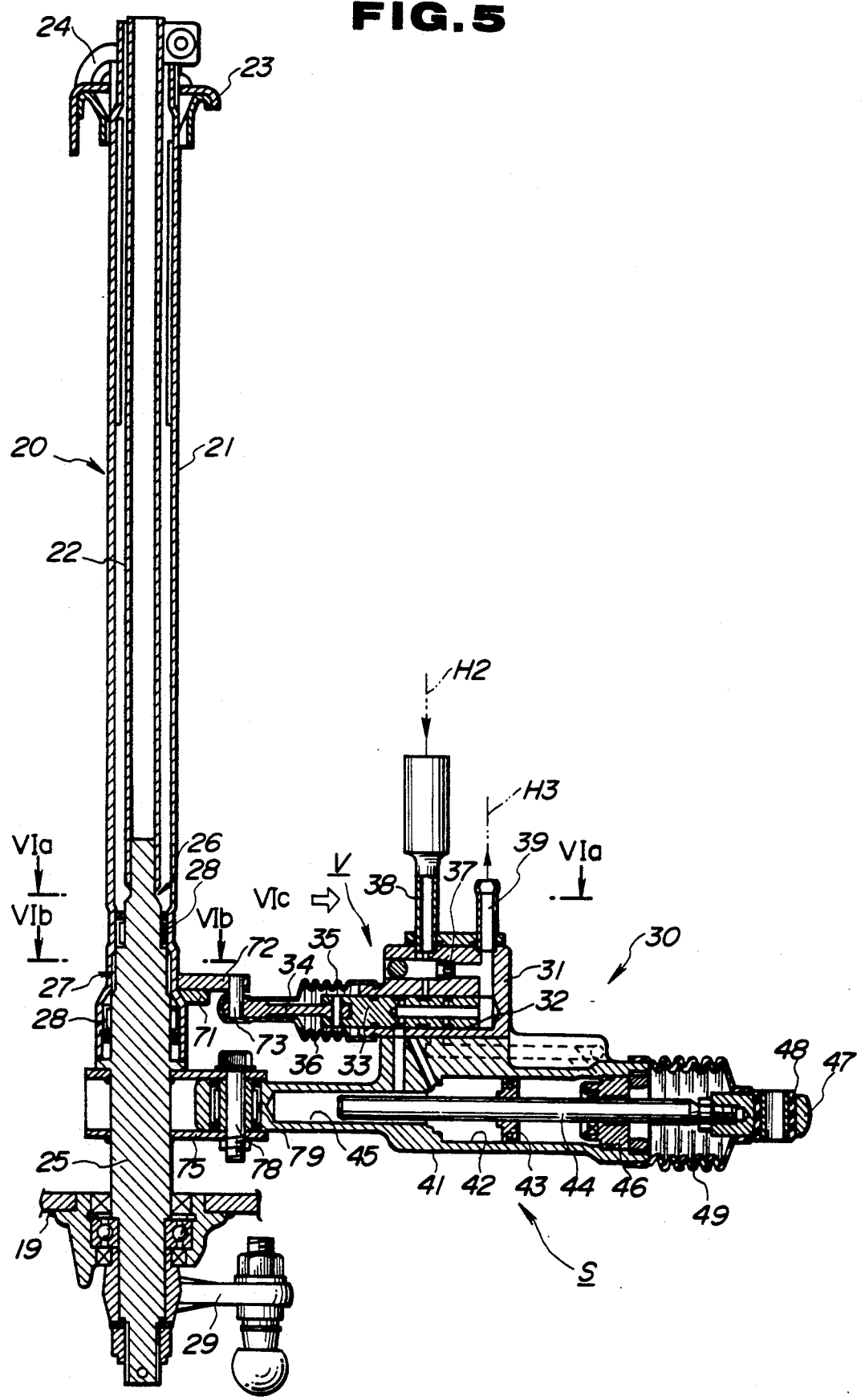
FIG. 5 is a vertical cross-sectional view of the power steering apparatus including the steering shaft and an actuator in accordance with the first embodiment.

The power steering apparatus of the invention is of a hydraulically operated structure. As shown in FIGS. 3 and 5, the power steering apparatus main comprises a control valve assembly V and a power cylinder assembly S which are housed in the actuator 30, an oil reservoir tank T, and an oil pump P. The reservoir tank T is fixedly positioned between upper portions of the front pipes 13. The oil pump P is fixed to the cylinder head 1a of the engine 1 and actuatable by a camshaft 1b directly or through a joint (not shown). The oil pump P may comprise a trochoid pump or the like. The oil pump P and the reservoir tank T are connected to each other by a suction hose H1. The oil pump P is connected to the actuator 30 by means of a feed hose H2. The actuator 30 is coupled to the reservoir tank T by a return hose H3.

As shown in FIG. 5, the steering shaft 20 comprises an outer shaft 21, an inner shaft 22 extending coaxially through the outer shaft 21, and a shaft end 25. The outer and inner shafts 21, 22 which are in the form of pipes have upper ends coupled to a steering bridge 23 to which the handlebar 7 is fixed by a pair of pipe connectors 24 (FIG.4).

The shaft end 25 has an upper end inserted into the lower end of the inner shaft 22 and fixed thereto by a welded coupling 26. The inner peripheral surface of the lower portion of the outer shaft 21 and the outer peripheral surface of the upper portion of the shaft end 25 are coupled to each other through splines 27 with gaps or plays g created on each side thereof in the direction in which the outer shaft 21 and the shaft end 25 are angularly movable with respect to each other, as shown in FIG. 6(b). Two bearings 28 are interposed between the outer shaft 21 and the shaft end 25 at respective positions above and below the splines 27. The steering arm 29 is fixedly attached to the lower end of the shaft end 25.

Figure 6A:
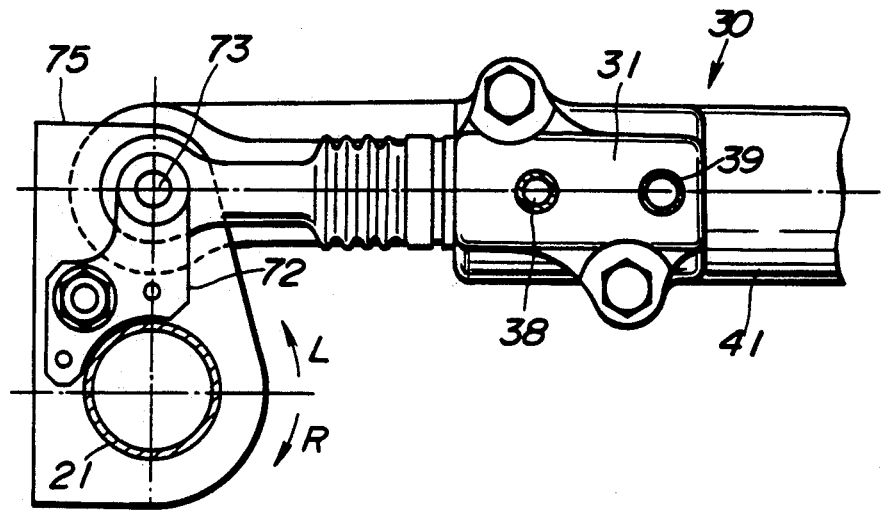
FIG. 6(a) is a plan view as viewed in the direction indicated by the arrow VIa in FIG. 5.
Figure 6B:
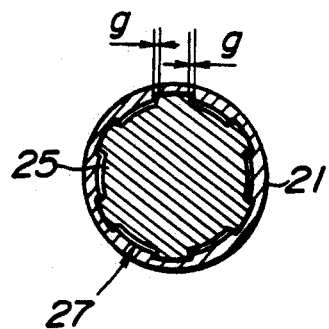
FIG. 6(b) is a cross-sectional view taken along line VIb—VIb of FIG. 5.
Figure 7:
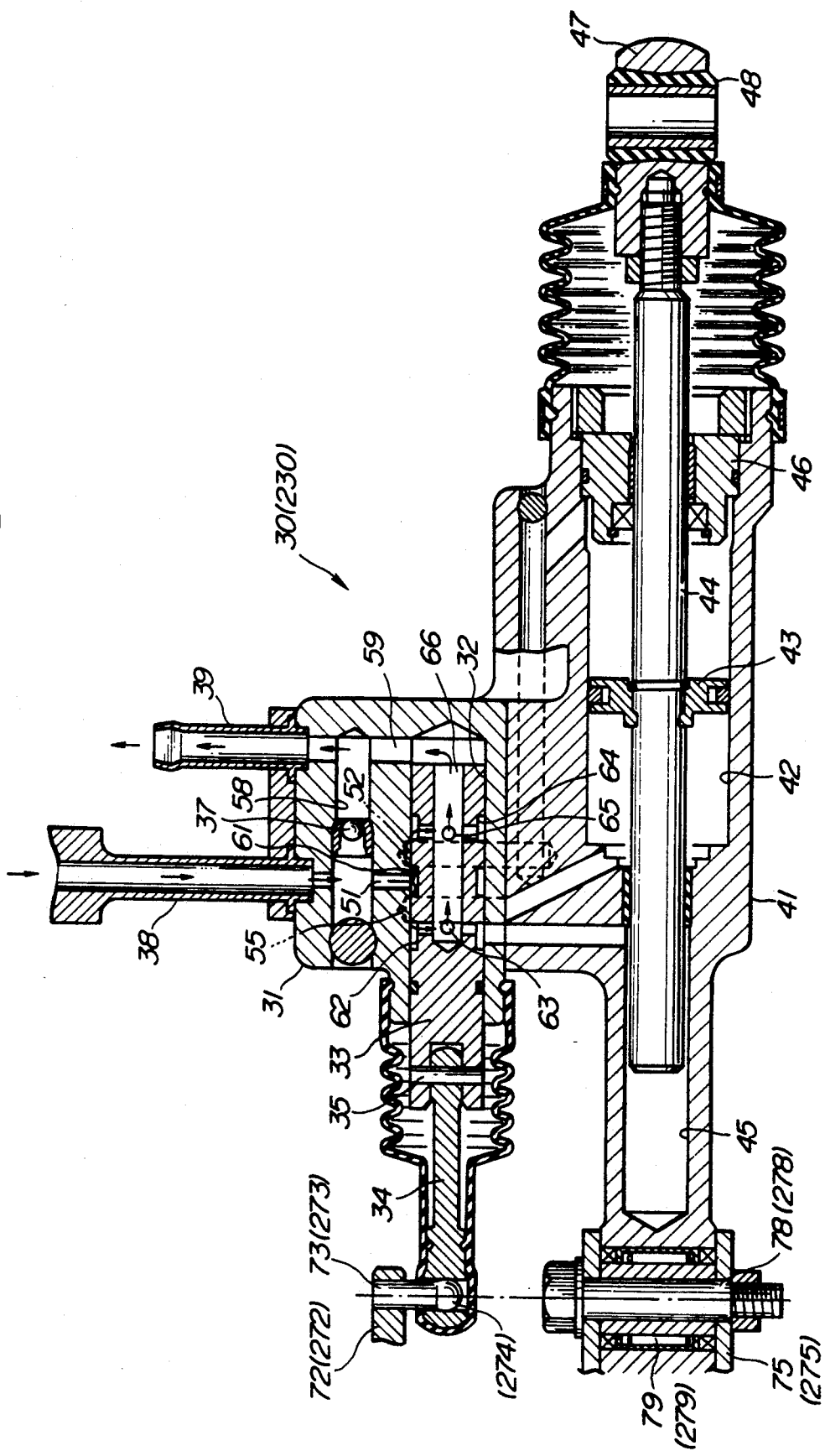
FIG. 7 is an enlarged vertical cross-sectional view of the actuator of the first embodiment at the time the motor vehicle runs straight ahead.

As shown in FIGS. 6(a), 6(b), and 7, the actuator 30 generally comprises a cylinder body 41 and a valve body 31 bolted to the cylinder body 41. The valve body 31 has a valve hole 32 defined therein and opening at its front side. The cylinder body 41 has a cylinder 42 defined therein and opening at its rear side. The valve hole 32 is disposed above the cylinder 42 and extends parallel thereto.

The valve body 31 includes a check valve 37 disposed in an upper portion thereof, two joints 38, 39 vertically mounted on an upper surface thereof for connection to the hoses H2, H3, respectively, and a spool valve 33 slidably disposed in the valve hole 32 and having a front projecting portion to which a spool rod 34 is pivotally connected by means of a vertical pin 35. The front projecting portion of the spool valve 33 and the spool rod 34 are covered with a boot 36 attached to and extending from the valve body 31. A stay 71 is welded or otherwise fixed to the outer peripheral surface of the lower portion of the outer shaft 21. A spool lever or arm 72 extending to the righthand side of the motor vehicle as viewed from the outer shaft 21 is bolted to the stay 71. The spool rod 34 has a front end pivotally coupled to a righthand end of the spool lever 72 by means of a vertical pin 73. The axis of the pin 73 serves as a first action point.

The cylinder body 41 has a piston 43 slidably disposed in the cylinder 42 with a seal therebetween, and a piston rod 44 supporting the piston 43 thereon. The piston rod 44 has a front portion projecting forwardly and inserted in a rod hole 45 defined in a front portion of the cylinder body 41. The piston rod 44 has a rear portion sealed by a rod guide 46 and projecting rearwardly out of the cylinder 42. A rod end 47 having a rubber bushing 48 with a collar therein is mounted on the projecting rear end of the piston rod 44. The rod end 47 is pivotally supported on the vertical shaft 17 on the pipe end 16 extending from the pipe 15. Between the cylinder body 41 and the rod end 47, there is disposed a boot 49 covering the exposed rear portion of the piston rod 44. A central arm 75 projecting to the righthand side of the motor vehicle is welded or otherwise fixed to the outer periphery of an intermediate portion of the shaft end 25. The front end of the cylinder body 41 is pivotally mounted by a bearing 79 on a vertical bolt 78 fastened to a projecting righthand end of the central arm 75. The axis of the bolt 78 serves as a second action point.

As described later on, the valve body 31, the cylinder body 41, and the spool valve 33 have various oil passages which will be supplied with working oil for moving the piston 43.

It is assumed in this embodiment that when the motor vehicle runs straight ahead, the vertical pin 73 and the vertical bolt 78 are aligned with each other.

Operation of the power steering apparatus according to the first embodiment will be described below.

Oil discharged by the oil pump P flows through the feed hose H2 and the spool valve 33 in the actuator 30, and then returns through the hose H3 to the reservoir tank T in which the oil is passed through a filter. Thereafter, the oil flows through the suction hose H1 back to the oil pump P. As shown in FIG. 7, the actuator 30 has defined therein a supply oil passage 51, a return oil passage 59, and a bypass oil passage 58 extending between the supply and return oil passages 51, 59. The check valve 37 is disposed in the bypass oil passage 58 for allowing oil to pass only from the return oil passage 59 to the supply oil passage 51, so that oil can be circulated in the actuator 30 when the oil pump is stopped.

Figure 6C:
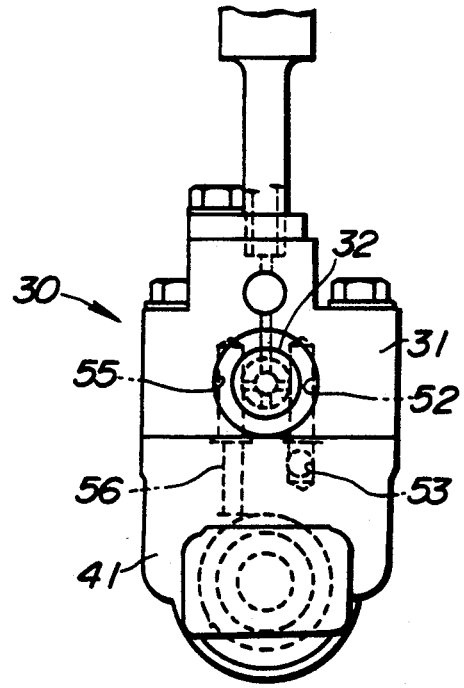
FIG. 6(c) is a front elevational view as viewed in the direction indicated by the arrow VIa in FIG. 5.

When the motor vehicle runs straight ahead with the handlebar 7 being not turned, oil which has entered the valve hole 32 through the supply oil passage 51 flows, as indicated by the arrows in FIG. 7, from a central recess 61 in the spool valve 33 through front and rear oil passages 55, 52 vertically defined in the valve body 31 on the left and righthand sides of the valve hole 32 (see also FIG. 6(c)) into front and rear recesses 62, 64, from which the oil passes through oil passages 63, 65 and a central oil passage 66 in the spool valve 33, and then through the return oil passage 59 into the reservoir tank T. At this time, the control valve assembly V is in equilibrium or in a state of balance.

When the handlebar 7 is turned to the right, the inner shaft 22 is twisted depending on the steering force applied thereto, and the outer shaft 21 coupled to the steering shaft end 25 through the splines 27 with the gaps g (FIG. 6(b)) is rotated clockwise as indicated by the arrow R in FIG. 6(a)) through an angular interval corresponding to the twist of the inner shaft 22. The spool rod 34 pivotally coupled to the spool lever 72 joined to the outer shaft 21 is thus moved rearwardly as indicated by the arrow in FIG. 8. The inner shaft 22 fixed to the shaft end 25 has been twisted depending on the steering force through an angle within an angle range corresponding to each gap g. The inner shaft 22 serves as a torsion bar lagging the outer shaft 21 upon rotation thereof, i.e., there is a certain phase difference between the inner shaft 22 and the outer shaft 21. A steering force commensurate with the twist of the inner shaft 22 is thus applied to the shaft end 25 and hence to the actuator 30 through the central arm 75 joined to the shaft end 25. Accordingly, during an initial phase of the steering operation, the spool lever 72 on the input side of the steering apparatus is rotated about the central axis of the steering shaft 20 with a phase difference with the central arm 75 on the output side of the steering apparatus.

The phase difference between the outer shaft 21 and the inner shaft 22 is amplified by the radius of angular movement of the spool lever 72, and the amplified phase difference is transmitted from the spool rod 34 to the spool valve 33. The spool valve 33 is then moved to vary the oil flow as shown in FIG. 8.

More specifically, when the spool valve 33 is moved rearwardly, oil flows from the supply oil passage 51 through the central recess 61, the oil passage 52, and oil passages 53, 54 in the cylinder body 41 into a rear oil pressure chamber in the cylinder 42. Oil in a front oil pressure chamber is then forced to flow through an oil passage 56 in the cylinder body 41 and the oil passage 55 into the front recess 62. Oil in the rod hole 45 also flows from an oil passage 57 in the cylinder body 41 into the front recess 62. The oil then flows from the front recess 62 through the oil hole 63 and the oil passage 66 into the return oil passage 59.

The piston 43 tends to move forwardly in the cylinder 42 under the pressure of the oil fed into the rear oil pressure chamber in the cylinder 42. However, since the piston rod 44 is supported on the vehicle frame by the rod end 47, the actuator 30 is moved rearwardly instead. The rearward movement of the actuator 30 then applies a force through the central arm 75 pivotally connected to the front end of the actuator 30 to the shaft end 25. The shaft end 25 is therefore rotated under oil pressure to reduce the steering force required for the rider to turn the handlebar 7.

The piston rod end 47 is supported on the vehicle frame 10 (i.e., the righthand lower steering shaft supporting pipe end 16) through the rubber bushing 48 for angular movement about the vertical shaft 17. Therefore, lateral swinging movement of the actuator 30 due to the rotation of the spool lever 72 and the central arm 75 is absorbed by the angularly movably supported piston rod end 47.

When the handlebar 7 is turned to the left, the outer shaft 21 is first rotated counterclockwise as indicated by the arrow L in FIG. 6(a) through an angular interval corresponding to the twist of the inner shaft 22, thus causing the spool lever 72 and the spool rod 34 to move the spool valve 33 forwardly as shown in FIG. 9. A steering force commensurate with the twist of the inner shaft 22 which serves as the torsion bar lagging the outer shaft 21 with a phase difference is applied to the shaft end 25, the central arm 75, and the actuator 30. Therefore, during an initial phase of the steering operation, the input spool lever 72 is rotated about the axis of the steering shaft 20 with a certain phase difference with the output central arm 75.

As shown in FIG. 9, upon forward movement of the spool valve 33, oil flows from the oil passage 51 through the central recess 61 and the oil passages 55, 56 into the front oil pressure chamber in the cylinder 42. Oil in the rear oil pressure chamber in the cylinder 42 is forced to flow through the oil passages 54, 53, 52, the rear recess 64, and the oil hole 65 into the oil passage 66. The oil is then divided into two flows, one of which goes through the oil hole 63, the front recess 62, and oil passage 57 into the rod hole 45, and the other of which flows from the oil passage 66 into the return oil passage 59.

The piston 43 tends to move rearwardly in the cylinder 42 under the pressure of the oil fed into the front oil pressure chamber in the cylinder 42. Therefore, the actuator 30 is moved forwardly to apply a force from the central arm 75 to the steering shaft end 25. The steering shaft end 25 is thus rotated under hydraulic pressure to reduce the manually applied steering force.

Irrespective of whether the handlebar 7 is turned to the left or the right, when the applied steering force is strong enough to turn the outer shaft 21 beyond the gaps g, the applied steering force is directly transmitted to the steering shaft end 25 through the splines 27. Since the cylinder 42 has in its front portion the rod hole 45 in which the piston rod 44 is movable back and forth, it is not necessary to provide any seal in the front wall of the cylinder 42. Oil can be supplied to and discharged from the rod hole 45 through the oil passage 57 when the piston rod 44 is moved. Thus, the piston rod 44 can smoothly be moved back and forth without substantial resistance.

With the hydraulically operated power steering apparatus of the present invention, the control valve assembly V and the power cylinder assembly S are not incorporated in the steering shaft, but integrally assembled in the actuator separately from the steering shaft, and an input/output mechanism required for oil pressure control is simply constructed of a phase difference generator comprising the inner shaft 22, the splines 27, etc., and simple structures such as a lever and an arm. The actuator 30 is compact, and the layout and construction of the parts of the power steering apparatus are designed with increased freedom. It is possible to vary the stroke of the spool valve of the control valve assembly V by varying the radii of angular movement of the lever and the arm. This, together with the selection of a spring constant of the steering inner shaft 22 as the torsion bar, allows the power steering apparatus to have desired power assisting characteristic settings.

While the power steering apparatus of the first embodiment is incorporated in the riding-type four-wheel motor vehicle, it can be mounted on a commercially available motor vehicle simply by replacing the steering system thereof.

A power steering apparatus according to a second embodiment of the present invention will be described below with reference to FIGS. 10 through 15. In the power steering apparatus of the first embodiment, the steering shaft is of a double-walled construction including an outer shaft and an inner shaft which serves as a torsion bar. With the torsion bar being twisted, the power assisting actuator can be operated at all times with a small steering force applied to allow the handlebar to be operated stably. On the other hand, even when a small steering force is applied, the oil pump is required to be driven by the engine, and the engine consumes a large amount of fuel. According to the second embodiment, in order to simplify the structure of the steering shaft, an elongate torsion bar is not employed and a dead zone is provided to keep the power assisting actuator inoperative when a small steering force is applied.

Figure 2:
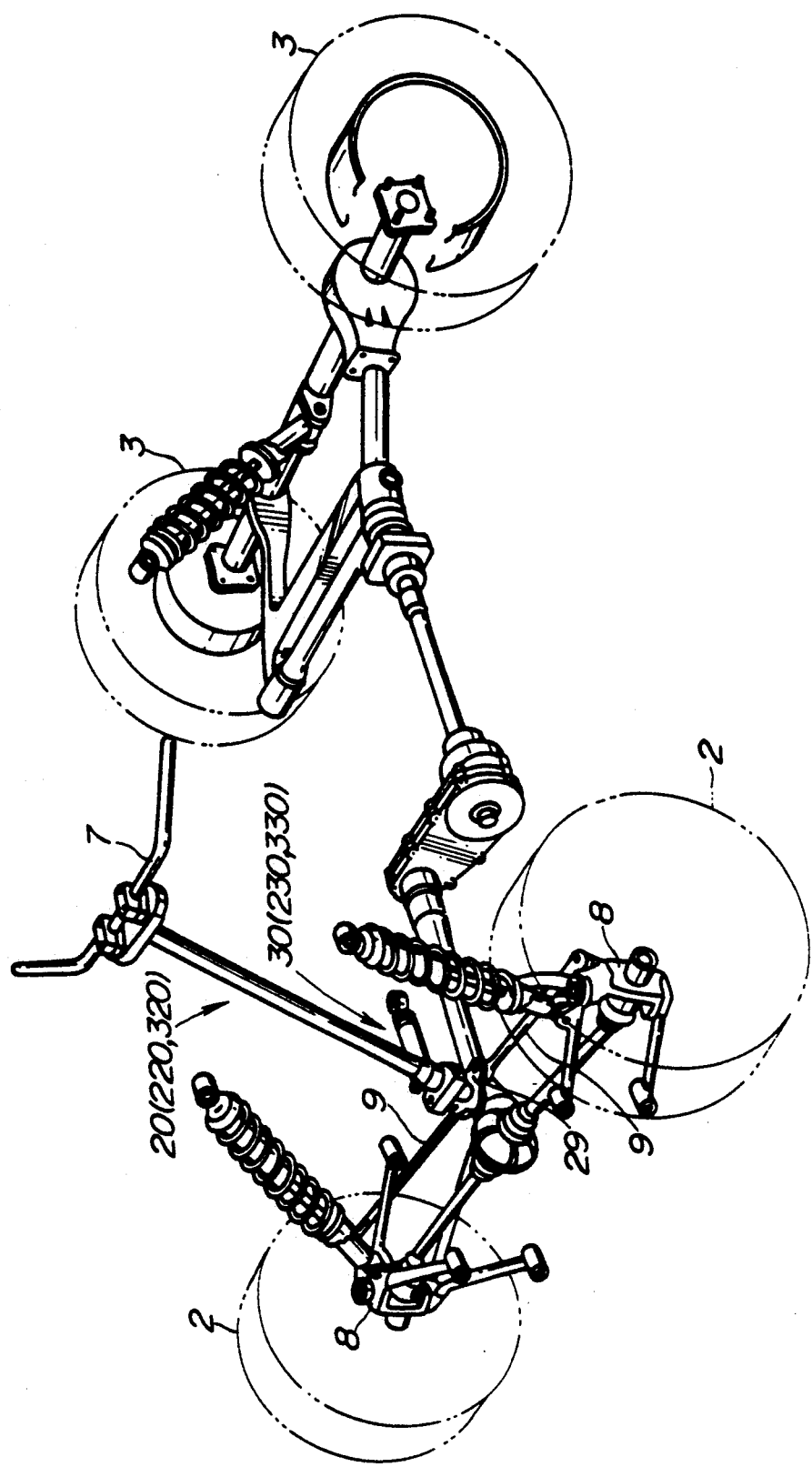
FIG. 2 is a schematic perspective view of a steering system, a power transmission system, and suspensions of the riding-type four-wheel motor vehicle shown in FIG. 1.

The power steering apparatus of the second embodiment is shown as being mounted on a riding-type four-wheel motor vehicle as shown in FIGS. 1 and 2, and has a tank T, a pump P, and an actuator 230 which are connected by hoses H1, H2, H3. The tank T, the pump P, and the actuator 230 are arranged and the actuator 230 is disposed in the front portion of the vehicle frame 10 as shown in FIGS. 10 and 11, in the same manner as with the first embodiment. The power steering apparatus of the second embodiment differs from that of the first embodiment only as to the structure of the steering shaft and the pivotal junction between the steering shaft and the actuator. The actuator 230 itself is structurally identical to the actuator 30 of the first embodiment.

Those parts of the power steering apparatus according to the second embodiment which are identical to those of the power steering apparatus of the first embodiment are denoted by identical reference numerals.

Figure 12:
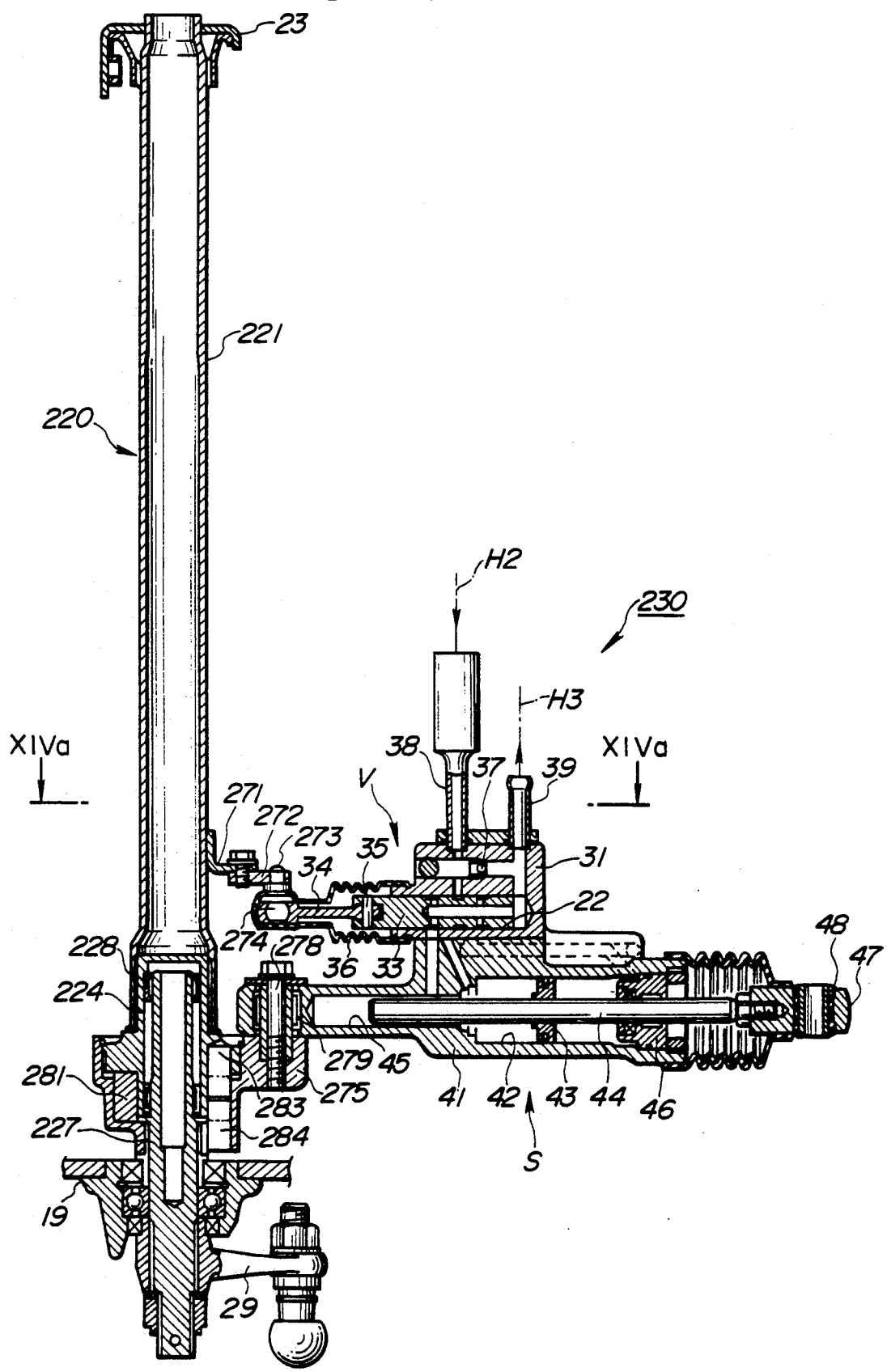
FIG. 12 is a vertical cross-sectional view of the power steering apparatus including the steering shaft and an actuator in accordance with the second embodiment.
Figure 13:
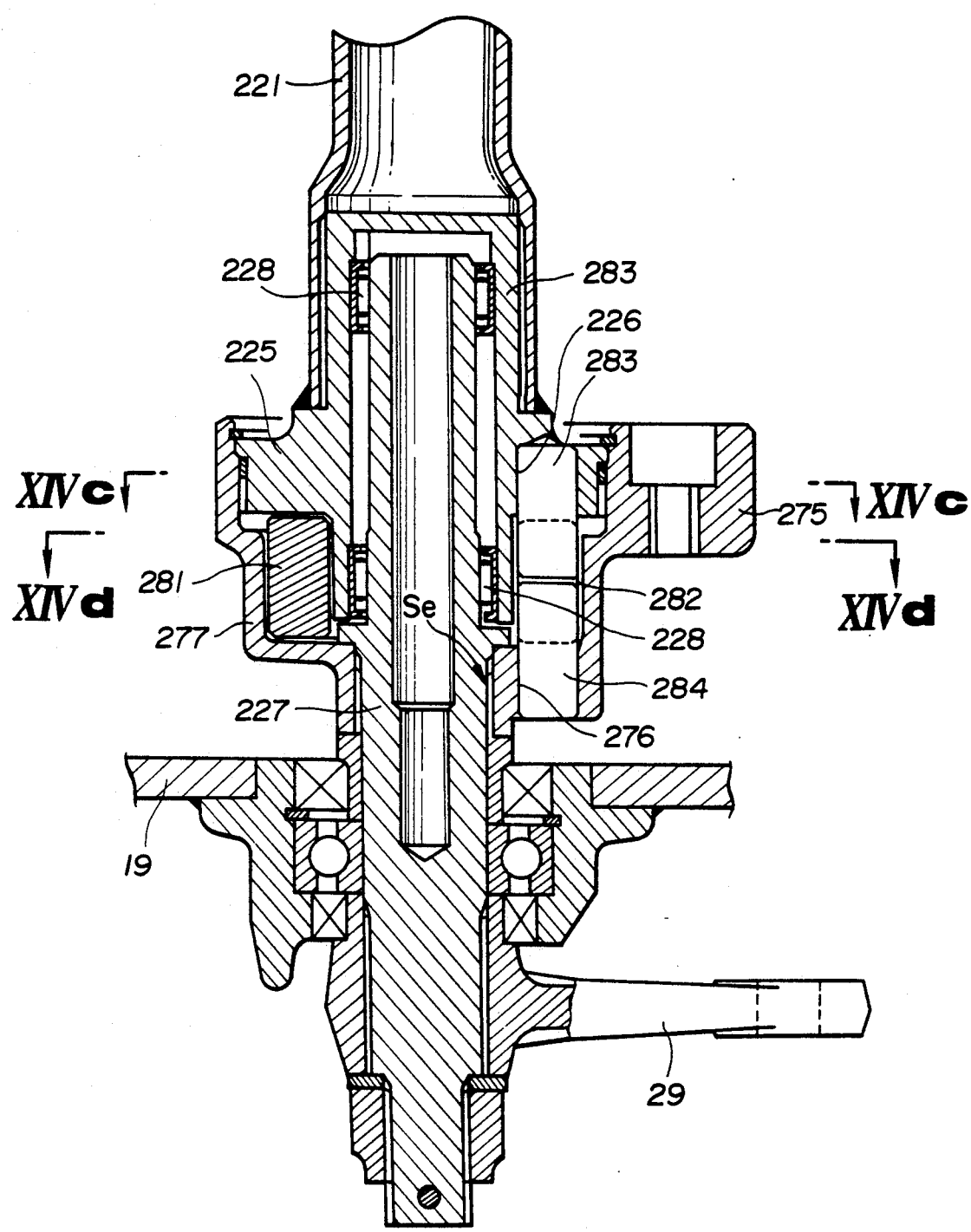
FIG. 13 is an enlarged fragmentary vertical cross-sectional view of a portion of the steering shaft to which the actuator of the second embodiment is to be connected.

As shown in FIGS. 12 and 13, the steering shaft, generally denoted at 220, comprises an elongate input shaft 221, and a shorter inner shaft 224 and an output shaft 227 which are disposed on the lower end of the input shaft 221. The input shaft 221 in the form of a pipe is coupled at its upper end to the steering bridge 23 to which the handle bar 7 is secured. The inner shaft 224 which has a closed upper end and an open lower end has an upper portion inserted in and welded to a lower portion of the input shaft 221. An upper portion of the output shaft 227 is mounted in the inner shaft 224 by means of upper and lower bearings 228. The steering arm 29 is fixed to the lower end of the output shaft 227.

A spool lever 272 is bolted to a stay 271 welded to the outer periphery of a lower portion of the input shaft 221. A central arm 275 is fixed by serrations Se to the outer periphery of an intermediate portion of the output shaft 227. The central arm 275 has a casing with a cylindrical recess therein, and a circular flange 225 on the intermediate portion of the inner shaft 224 is inserted in an upper cylindrical portion of the central arm 275. The central arm 275 and the inner shaft 224 are coupled to each other by means of splines Sp with gaps g on the opposite sides of each spline in the direction in which they are relatively rotatable, as shown in FIG. 14(b).

The flange 225 of the inner shaft 224 and the bottom of the central arm 275 have respective pin holes 226, 276 extending parallel to the axis of the steering shaft 220. The pin holes 226, 276 have respective axes held in substantial alignment with each other when the inner shaft 224 and the central arm 275 are coupled to each other by the splines Sp. The central arm 275 has a lower cylindrical portion 277 spaced outwardly from and covering a small-diameter portion of the inner shaft 224 below the flange 225. A preset spring 281 is housed in the lower cylindrical portion 277, the preset spring 281 being of a C shape as viewed in plan as shown in FIG. 14(c).

The preset spring 281 which is of a rectangular cross section has opposite ends 282 of arcuate surfaces, between which there are disposed a lower portion of an input pin 283 inserted in the pin hole 226 in the inner shaft 224 and an upper portion of an output pin 284 inserted in the pin hole 276 in the central arm 275.

The preset spring 281 circumferentially grips or compresses the input and output pins 283, 284 under a preset load between the ends 282 thereof. The input and output pins 283, 284 are therefore axially aligned with each other under the preset load. In the second embodiment, the splines Sp, the preset spring 281, and the input and output pins 283, 284 serve as a phase different generating means.

As described above, the power assisting actuator 230 is the same in structure as the actuator 30 according to the first embodiment shown in FIGS. 7 through 9. The pump P and the tank T coupled to the actuator 230 are also identical to those of the first embodiment. The actuator 230 and the steering shaft 220 are connected to each other in the same manner as with the first embodiment, as shown in FIG. 12. The spool lever (or arm) 272 projecting to the right from the outer periphery of the lower portion of the input shaft 221 is bolted to the stay 271 welded or otherwise fixed to the outer periphery of the lower portion of the input shaft 221, and the front end of the spool rod 34 is pivotally connected to the righthand end of the spool lever 272 by a vertical pin 273 and a ball-and-socket joint 274. The central arm 275 has a projection projecting to the right from the outer periphery of the intermediate portion of the output shaft 227, and the front end of the cylinder body 41 is pivotally connected to the righthand end of the projection by means of a vertical bolt 278 and a bearing 279. As with the first embodiment, when the motor vehicle runs straight ahead, the vertical pin 273, the ball-and-socket joint 274, and the vertical bolt 278 are axially aligned with each other.

The power steering apparatus of the second embodiment operates as follows:

While the motor vehicle runs straight ahead with the handle bar 7 not turned, oil from the pump P flows through the oil passages in the actuator 230 back to the reservoir tank T, and the actuator 230 is in equilibrium, as described above with reference to FIG. 7 for the first embodiment.

Figure 14A:
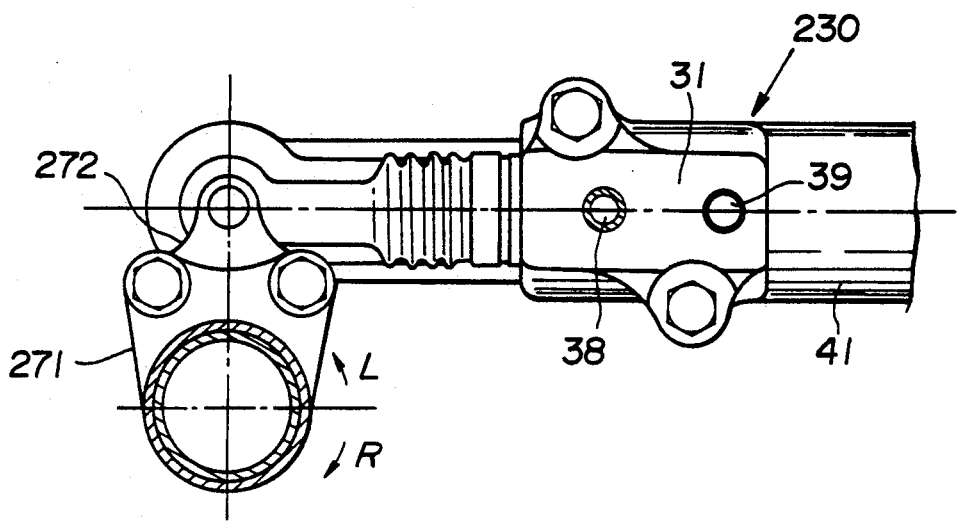
FIG. 14(a) is a plan view as viewed in the direction indicated by the arrow XIVa in FIG. 12.
Figure 14B:
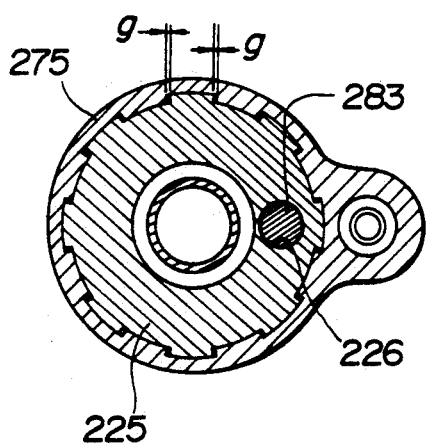
FIG. 14(b) is a cross-sectional view taken along line XIVb—XIVb of FIG. 12.
Figure 14C:
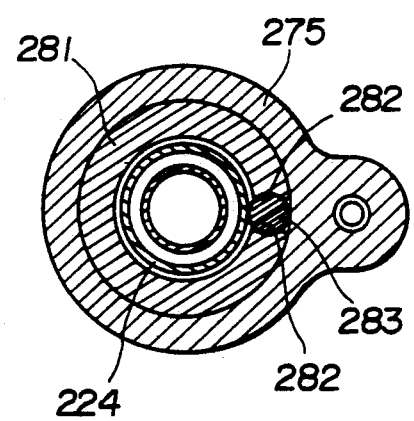
FIG. 14(c) is a cross-sectional view taken along line XIVc—XIVc of FIG. 12.

When the handlebar 7 is turned to the right, the input shaft 221 integral with the inner shaft 224 which is coupled to the output shaft 227 through the splines Sp with the gaps g as shown in FIG. 14(b) is first turned clockwise as indicated by the arrow R in FIG. 14(a) through an angular interval corresponding to each gap g or an angular interval within the angular range corresponding to each gap g. If the steering force applied is larger than the preset load of the preset spring 281 at this time, the input shaft 221 is first rotated against the preset load of the preset spring 281 through the angular interval corresponding to the gap g or the angular interval within the angular range corresponding to the gap g, so that a phase difference is produced between the input shaft 221 and the output shaft 227.

The spool rod 34 pivotally coupled to the spool lever 272 integral with the input shaft 221 is then moved rearwardly as shown in FIG. 8 for the first embodiment.

During an initial phase of the steering operation in which the steering force is larger than the preset load of the preset spring 281, the spool lever 272 on the input side of the power steering apparatus is rotated about the central axis of the steering shaft 220 with a phase difference with the central arm 275 on the output side of the power steering apparatus.

The phase difference between the input shaft 221 and the output shaft 227 is amplified by the radius of angular movement of the spool lever 272, and the amplified angular difference is applied from the spool rod 34 to the spool valve 33. Upon the movement of the spool valve 33, the oil flows as shown in FIG. 8 in the same manner as with the first embodiment.

As a result, the actuator 30 is moved rearwardly as a whole to apply a force to the output shaft 227 through the central arm 275 pivotally coupled to the front end of the cylinder body 41. The output shaft 227 is thus rotated under hydraulic pressure to reduce the steering force manually applied to the handlebar 7.

Because the piston rod end 47 is pivotally supported on the vehicle frame 10 by the rubber bushing 48 for angular movement about the vertical shaft 17, lateral swinging movement of the actuator 230 due to rotation of the spool lever 272 and the central arm 275 is absorbed by the pivotally movably supported piston rod end 47.

When the handlebar 7 is turned to the left, if the steering force applied is larger than the preset load of the preset spring 281, the input shaft 221 is first rotated counterclockwise as indicated by the arrow L in FIG. 14(a) through an angular interval corresponding to the gap g or an angular interval within an angle range corresponding to the gap g. The input shaft 221 then forces the spool lever 272 and the spool rod 34 to move the spool valve 33 forwardly as shown in FIG. 9 in the same manner as with the first embodiment, whereupon oil flows in the actuator 230 in the same manner as with the first embodiment.

As a consequence, the actuator 30 is bodily moved forwardly to apply a force from the central arm 275 to the output shaft 227, which is therefore turned under hydraulic pressure to reduce the manually applied steering force.

Regardless of whether the handlebar 7 is turned to the left or the right, if the applied steering force is strong enough to turn the input shaft 221 beyond the gaps g, the input steering force is directly applied through the splines Sp to the output shaft 227. Conversely, if the applied steering force is smaller than the preset load of the preset spring 281, the input shaft 221 including the inner shaft 224 and the output shaft 227 are rotated together through the input and output pins 283, 284 interposed between the ends 282 of the preset spring 281 and the preset spring 281 itself. At this time, the actuator 230 is not operated since there is not phase difference produced between the input shaft 221 and the output shaft 227.

Figure 15:
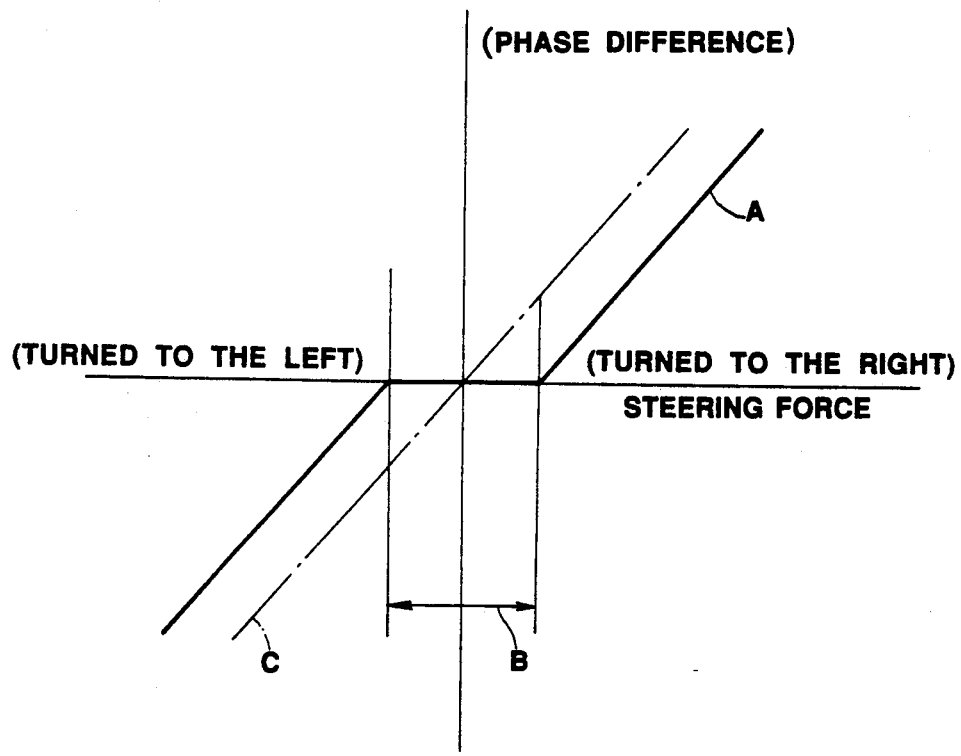
FIG. 15 is a graph showing the relationship between a steering force and a phase difference in the power steering apparatus according to the second embodiment.
Figure 18:
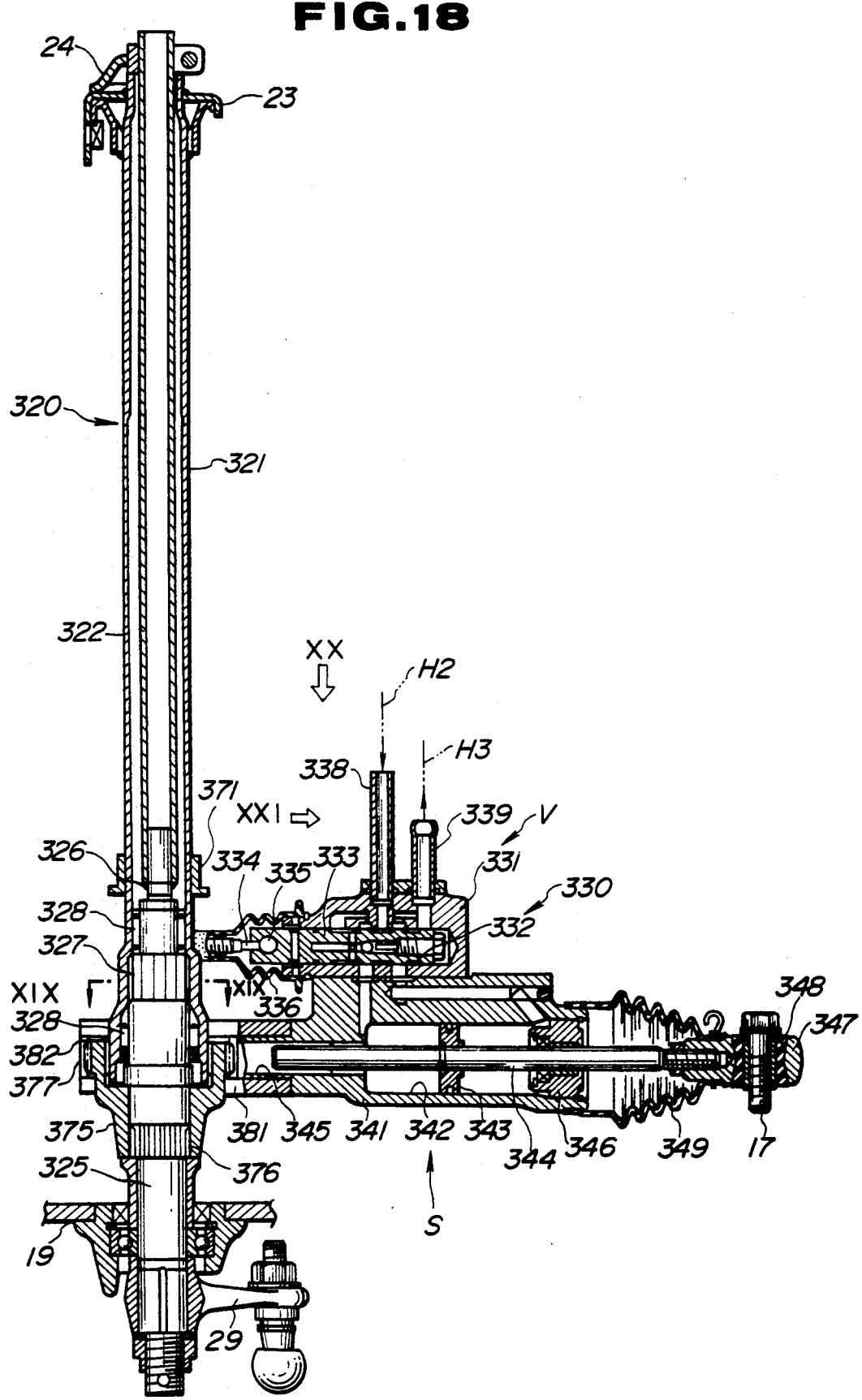
FIG. 18 is a vertical cross-sectional view of the power steering apparatus including the steering shaft and an actuator in accordance with the third embodiment.

When the applied steering force is very small for turning the handlebar 7 a little while the motor vehicle is running straight ahead, for example, the steering force is lower than the preset load of the preset spring 281. Therefore, as shown in FIG. 15, there is a dead zone B in which the actuator 230 is not operated as indicated by a solid-line characteristic curve A. Where the actuators 30, 230 are hydraulically operated as in the first and second embodiments, the oil pump P discharges a lowest oil pressure in the dead zone B, and hence the power required by the engine 1 to drive the oil pump P may be small. The fuel economy of the engine 1 when the steering force is small is therefore improved.

According to the first embodiment which employs the double-walled steering shaft 20 with the twistable torsion bar inserted substantially fully in the outer shaft 21, however, the actuator 30 is operated also when the applied steering force is small as indicated by the broken line C in FIG. 15 and the power required to drive the oil pump P is large.

The preset load of the preset spring 281 may be of a suitable value selected depending on the type of the motor cycle and desired power steering characteristics.

With the power steering apparatus according to the second embodiment, the preset spring is disposed between and in engagement with the input and output shafts of the steering shaft, resulting in a simple steering shaft structure with no torsion bar, and providing a dead zone in which the power assisting actuator is not operated with a small steering force. Therefore, if the actuator is hydraulically operated, when the applied steering force is small, the power required by the engine to drive the oil pump is reduced to improve fuel economy of the engine.

FIGS. 16 through 30 show a power steering apparatus according to a third embodiment of the present invention.

In each of the power steering apparatus of the first and second embodiments, the actuator and the steering shaft are coupled to each other by a link mechanism including an arm. The central line of the actuator is angularly shifted or varied depending on the path of angular movement of the arm about the steering shaft. Therefore, the power assisting force generated by the actuator along its central line is represented by a component tangential to the path of angular movement of the arm. The power assisting force thus becomes smaller as the handlebar is turned through a larger steering angle. As a result, in the range in which the handlebar 7 is power-assisted, a larger steering force is required as the steering angle becomes larger from the steering neutral position. The handlebar can be turned with a small steering force in a small steering angle range which is normally employed. In a larger steering angle range which is employed when the motor vehicle runs at a low speed, the steering force required is increased to prevent the rider from turning the handlebar 7 excessively.

According to the third embodiment, a power assisting actuator disposed separately from a steering mechanism is so connected to a steering shaft as to reduce any angular shifting of the central axis of the actuator as much as possible, with the result that the power assisting force generated by the actuator will effectively be utilized for increased actuator performance.

Figure 19:
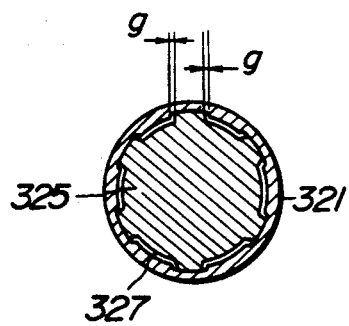
FIG. 19 is a cross-sectional view taken alone line XIX—XIX of FIG. 18.
Figure 21:
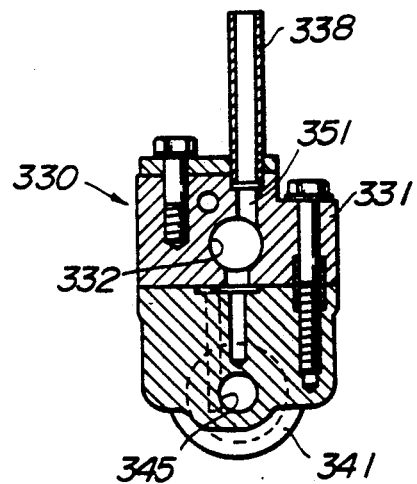
FIG. 21 is a front elevational view as viewed in the direction indicated by the arrow XXI in FIG. 18.

The power steering apparatus of the third embodiment is shown as being mounted on a riding-type four-wheel motor vehicle as shown in FIGS. 1 and 2, and has a tank T, a pump P, and an actuator 230 which are connected by hoses H1, H2, H3. The tank T, the pump P, and the actuator 230 are arranged and the actuator 230 is disposed in the front portion of the vehicle frame 10 as shown in FIGS. 16 and 17, in the same manner as with the first embodiment. A steering shaft 330 in the power steering apparatus of the third embodiment comprises an output shaft 321, an inner shaft 322 serving as a torsion bar, and a shaft end 325. The output shaft 321 and the inner shaft 322 which are in the form of pipes have upper ends coupled to a steering bridge 23 to which the handlebar 7 is fixed by a pair of pipe connectors 24 (FIG. 17). The shaft end 325 has an upper end inserted into the lower end of the inner shaft 322 and fixed thereto by a welded coupling 326. The inner peripheral surface of the lower portion of the outer shaft 321 and the outer peripheral surface of the upper portion of the shaft end 325 are coupled to each other through splines 327 with gaps or plays g created on each side thereof in the direction in which the outer shaft 321 and the shaft end 325 are angularly movable with respect to each other, as shown in FIG. 19. Two bearings 328 are interposed between the outer shaft 321 and the shaft end 325 at respective positions above and below the splines 327. The steering arm 29 is fixedly attached to the lower end of the shaft end 325.

As shown in FIG. 22, the actuator 330 generally comprises a cylinder body 341 and a valve body 331 bolted to the cylinder body 341. The valve body 331 has a valve hole 332 defined therein and opening at its front side. The cylinder body 341 has a cylinder 342 defined therein and opening at its rear side. The valve hole 332 is disposed above the cylinder 342 and extends parallel thereto.

The valve body 331 includes two joints 338, 339 vertically mounted on an upper surface thereof for connection to the hoses H2, H3, respectively, and a spool valve 333 slidably disposed in the valve hole 332 and having a front projecting portion to which a spool rod 334 is pivotally connected by means of a ball-and-socket joint 335. The front projecting portion of the spool valve 333 and the spool rod 334 are covered with a boot 336 attached to and extending from the valve body 331. A stay 371 is welded or otherwise fixed to the outer peripheral surface of the lower portion of the outer shaft 321. A spool lever or arm 372 extending to the righthand side of the motor vehicle as viewed from the outer shaft 321 is bolted to the stay 371 (see FIGS. 20 and 22). The spool rod 334 has a front end pivotally coupled to a righthand end of the spool lever 372 by means of a ball-and-socket joint 334.

The cylinder body 341 has a piston 343 slidably disposed in the cylinder 342 with a seal therebetween, and a piston rod 344 supporting the piston 343 thereon. The piston rod 344 has a front portion projecting forwardly and inserted in a rod hole 345 defined in a front portion of the cylinder body 341. The piston rod 344 has a rear portion sealed by a rod guide 346 and projecting rearwardly out of the cylinder 342. A rod end 347 having a rubber bushing 348 with a collar therein is mounted on the projecting rear end of the piston rod 344. The rod and 347 is pivotally supported on the vertical shaft 17 on the pipe end 16 extending from the pipe 15. Between the cylinder body 341 and the rod end 347, there is disposed a boot 349 covering the exposed rear portion of the piston rod 344.

A central pipe 375 is fixed to the outer periphery of an intermediate portion of the shaft end 325 through lower serrations 376. A pinion 377 is formed on the outer periphery of the upper end of the central pipe 375. A slidable bushing 378 is interposed between the outer periphery of the lower end of the outer shaft 321 around which the pinion 377 is positioned and the inner periphery of the upper end of the central pipe 375.

The pinion 377 is held in mesh with a rack 382 on a rack pipe 381 fixedly fitted in a front portion of the cylinder body 341 of the actuator 330. As illustrated in FIGS. 23 and 24, the rack pipe 381 has a bearing guide groove 383 defined in a side opposite to the rack 382, and a ball bearing 385 supported on a rod 386 is fitted in the bearing guide groove 383. The rod 386 is vertically mounted on the pipe 15 on the righthand side of the vehicle frame, for example.

According to the third embodiment, when the motor vehicle runs straight ahead, the ball-and-socket joint 373 is positioned on the axis of the steering shaft 320 as viewed in side elevation. As described later on, the valve body 331, the cylinder body 341, and the valve 333 have oil passages defined therein for passage therethrough working oil, the oil passages being defined differently from those in the first embodiment.

FIG. 22 shows the position of the parts when the actuator 330 is in normal operation while the motor vehicle runs straight ahead with the handlebar 7 not turned. As indicated by the arrows, oil which has entered the valve hole 332 from a supply oil passage 351 flows from a central recess 361 in the spool valve 333 through oil passages 352, 353 vertically defined in inner walls of the valve hole 332 into left and right recesses 362, 363, from which the oil flows directly or through an oil passage 364 via a return oil passage 359 and a joint 339 into the reservoir tank T. A check valve 337 disposed in the spool valve 333 for allowing an oil flow only from the return oil passage 359 to the supply oil passage 351 is effective in circulating oil in the actuator 330 when the pump is stopped.

Figure 20:
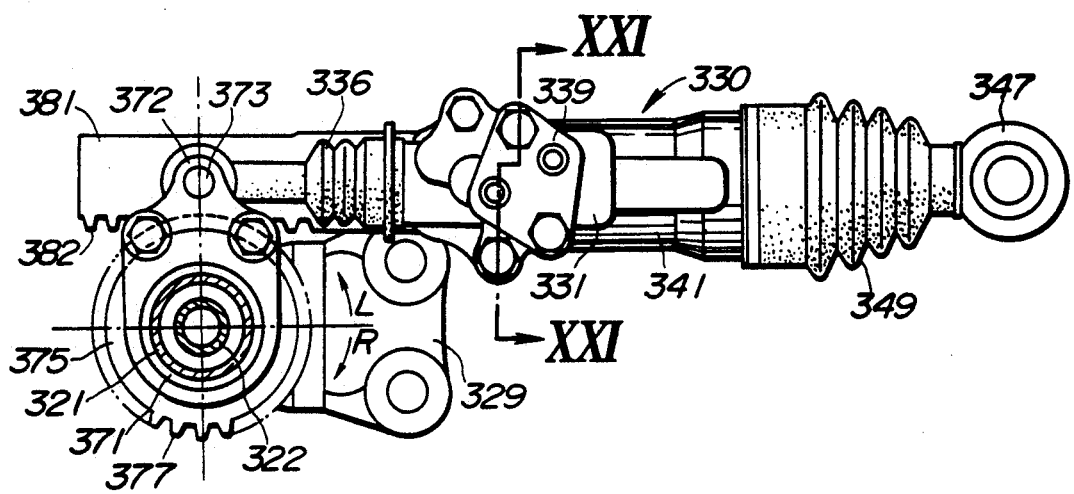
FIG. 20 is a plan view as viewed in the direction indicated by the arrow XX in FIG. 18.

When the handlebar 7 is turned to the right, the inner shaft 322 is twisted depending on the steering force applied thereto, and the outer shaft 321 coupled to the steering shaft end 325 through the splines 327 with the gaps g (FIG. 19) is rotated clockwise as indicated by the arrow R in FIG. 20 through an angular interval corresponding to the twist of the inner shaft 322. The spool rod 334 pivotally coupled to the spool lever 372 joined the outer shaft 321 is thus moved rearwardly as indicated by the arrow in FIG. 25. The inner shaft 322 fixed to the shaft end 325 has been twisted depending on the steering force through an angle in an angle range corresponding to each gap g. The inner shaft 322 serves as a torsion bar lagging the outer shaft 321 upon rotation thereof, i.e., there is a certain phase difference between the inner shaft 322 and the outer shaft 321. A steering force commensurate with the twist of the inner shaft 322 is thus applied to the shaft end 325 and hence to the actuator 330 through the pinion 377 on the central pipe 375 integral with the shaft end 375 and the rack 382 on the rack pipe 381 integral with the cylinder body 341, the steering force being applied as linear motion aligned with the central axis of the actuator. Accordingly, during an initial phase of the steering operation, the spool lever 372 on the input side of the steering apparatus is rotated about the central axis of the steering shaft 320 with a phase difference with the central arm 375 on the output side of the steering apparatus.

The phase difference between the outer shaft 321 and the inner shaft 322 is amplified by the radius of angular movement of the spool lever 372, and the amplified phase difference is transmitted from the spool rod 334 to the spool valve 333. The spool valve 333 is then moved to vary the oil flow as shown in FIG. 25.

More specifically, when the spool valve 333 is moved rearwardly, oil flows from the supply oil passage 351 through the central recess 361, and the oil passages 352, 356, 355 into a rear oil pressure chamber in the cylinder 342. Oil in a front oil pressure chamber is then forced to flow through oil passages 354, 353 in the cylinder body 341 into the recess 363. Oil in the rod hole 345 also flows from oil passages 357, 358 into the recess 363. The oil then flows from the oil passage 364 into the return oil passage 359.

The piston 343 tends to move forwardly in the cylinder 342 under the pressure of the oil fed into the rear oil pressure chamber in the cylinder 342. However, since the piston rod 344 is supported on the vehicle frame by the rod end 347 (through the vertical shaft 17), the actuator 330 is moved rearwardly instead. The rearward movement of the actuator 330 then applies a force through the rack 382 and the pinion 377 to the shaft end 325. The shaft end 325 is therefore rotated under oil pressure to reduce the steering force required for the rider to turn the handlebar 7.

Figure 26:
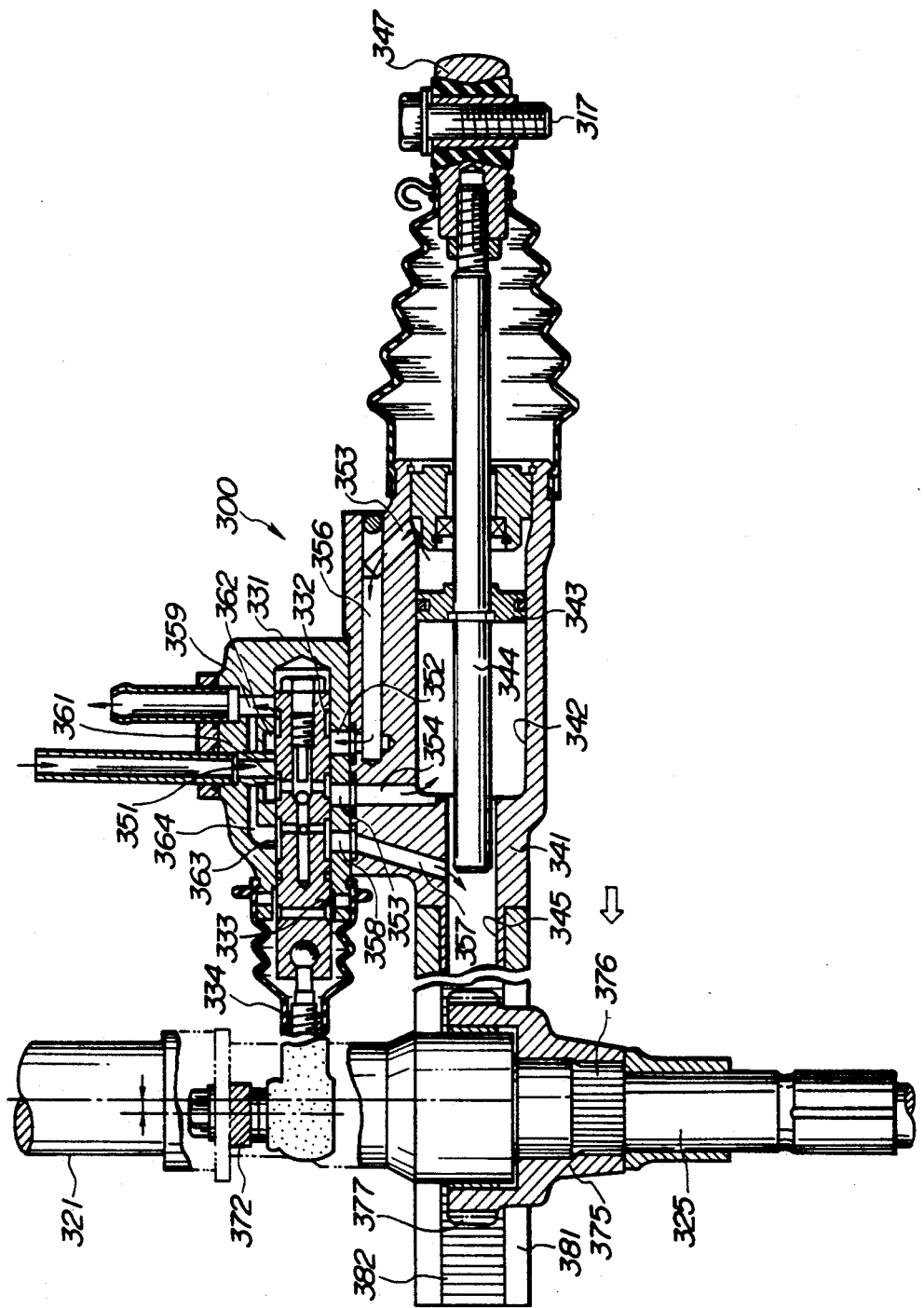
FIG. 26 is an enlarged vertical cross-sectional view of the actuator when the steering handle is turned to the left.

When the handlebar 7 is turned to the left, the outer shaft 321 is first rotated counterclockwise as indicated by the arrow L in FIG. 20 through an angular interval corresponding to the twist of the inner shaft 322, thus causing the spool lever 372 and the spool rod 334 to move the spool valve 333 forwardly as shown in FIG. 26. A steering force commensurate with the twist of the inner shaft 322 which serves as the torsion bar lagging the outer shaft 321 with a phase difference is applied from the shaft end 325 through the pinion 377 and the rack 382 to the actuator 330. Therefore, during an initial phase of the steering operation, the input spool lever 372 is rotated about the axis of the steering shaft 320 with a certain phase difference with the output central arm 375.

As shown in FIG. 26, upon forward movement of the spool valve 333, oil flows from the oil passage 351 through the central recess 361 and the oil passages 353, 354 into the front oil pressure chamber in the cylinder 342. Oil in the rear oil pressure chamber in the cylinder 342 is forced to flow through the oil passages 354, 356, 352 and the recess 362 into the return oil passage 359. The oil then flows from the oil passage 364, the recess 363, and the passages 358, 357 into the rod hole 345.

The piston 343 tends to move rearwardly in the cylinder 342 under the pressure of the oil fed into the front oil pressure chamber in the cylinder 342. Therefore, the actuator 330 is moved forwardly to apply a force from the rack 382 and the pinion 377 to the steering shaft end 325. The steering shaft end 325 is thus rotated under oil pressure to reduce the manually applied steering force.

Irrespective of whether the handlebar 7 is turned to the left or the right, when the applied steering force is strong enough to turn the outer shaft 321 beyond the gaps g, the applied steering force is directly transmitted to the steering shaft end 325 through the splines 327.

The rack 382 on the rack pipe 381 fixed to the cylinder body 341 tends to move outwardly from the central axis of the steering shaft end in a direction out of mesh with the pinion 377 under a pressure component due to the pressure angle of the meshing teeth of the rack 382 and the pinion 377. However, since the ball bearing 385 positioned and supported on the rod 386 fixed to the vehicle frame 10 is fitted in the bearing guide groove 383 defined in the rack pipe 381 on its side opposite to the rack 382, the rack 382 is held in proper mesh with the pinion 377 at all times.

The functional characteristics of the power steering apparatus of the third embodiment and the power steering apparatus of the first or second embodiment, which have different structures interconnecting the steering shaft and the actuator, will be compared with each other below.

In the power steering apparatus of the first embodiment, the cylinder body 41 (or the power cylinder assembly S) of the actuator 30 and the steering shaft 20 are coupled to each other by a link mechanism including the central arm 75 fixed to the steering shaft 20 pivotally joined to the cylinder body 41. Therefore, the pivotal junction between the central arm and the actuator follows an arcuate path from the steering neutral position N to left and right maximum steering positions a, b as the steering angle varies, as shown in FIG. 30. The central line or axis of the actuator is angularly moved about a pivot P (the vertical shaft 17) to change its direction (see Ca, Cb). Accordingly, an assisting force Pa produced by the actuator at the point a includes a force component Fs (Fa>Fs) normal to the radius of the arcuate path at the point a (i.e., the arm 75 having a length R from the center of the shaft 20), the force component Fs being only available as a steering moment. The steering moment is of a value represented by Fs·R, which is smaller than the moment Fa·R near the steering neutral position N. This means that a line segment having a length r and extending from a point O perpendicularly to a line along which the assisting force acts at the point a becomes a quasi-arm on which the assisting force Fa acts (Fs·R=Fa·r). As the arm swings from the steering neutral position N, the length r of the quasi-arm for the assisting force Fa to act as a steering moment around the steering shaft varies. Thus, the power assisting force is reduced as the steering angle increases from the straight-ahead position. Stated otherwise, as the steering force increases from the straight-ahead position, the length of the arm on which the assisting force Fa acts is quasi-reduced, or the arm ratio (r/R) is gradually reduced.

An effect similar to that described above takes place between the valve body 31 (or the control valve assembly V) of the actuator 30 and the steering shaft 20, because the spool lever 72 fixed to the steering shaft 20 is pivotally coupled to the valve body 31, thus providing a link mechanism. The spool valve 33 which is slidable back and forth from the equilibrium condition for controlling the power cylinder assembly S in the valve body 31 that is angularly movable about the pivot (vertical shaft 17) controls the operation of the power cylinder assembly S depending on the distance which the spool valve 31 slides. The distance of sliding movement of the spool valve 31 depends on the arm ratio of the quasi-arm which varies according to the angular movement of the spool lever 72 (arm) as the steering angle increases or decreases (the distance of sliding movement of the spool valve 31 is not linearly proportional to the change in the steering angle).

The above effect holds true for the power steering apparatus according to the second embodiment.

According to the third embodiment, the junction between the actuator shaft 330 (cylinder body 341) and the steering shaft 320 (shaft end 325) comprises a rack and pinion mechanism including the rack 382 on the cylinder body 382 and the pinion 377 on the shaft end 325 which meshes with the rack 382. Therefore, as shown in FIG. 30, the rack 382 meshing with the pinion 377 follows a linear path from the steering neutral position N to one of left and right maximum steering positions $a_1$, $b_1$. Since the actuator 330 effects only linear motion along the central line (central cylinder axis) $C_1$, the power assisting force does not vary depending on the steering angle as with the first embodiment, but remains to be of a value Fa·R at all times. Because the power assisting force Fa·R which remains unchanged can be produced, the steering force required for the rider to apply to the handlebar does not vary depending on the radius of a cornering circle of the motor vehicle (i.e., does not increase with the steering angle), and hence the handlebar can further be operated with greater ease.

The spool lever 372 and the spool valve 333 are connected to each other through the spool rod 334 and the ball-and-socket joints 373, 335 on its opposite ends. Consequently, swinging movement of the spool lever 372 and the spool rod 334 due to linear motion of the actuator 330 along the central line $C_1$ is absorbed by the ball-and-socket joints 373, 335.

The power steering apparatus according to the third embodiment may employ a rack and pinion mechanism in the junction between the steering shaft 321 and the spool valve 333 as shown in FIG. 27. As also shown in FIGS. 28 and 29, an input pipe 391 having a pinion 392 is welded or otherwise fixed to the outer shaft 321, and a rack bar 393 is welded or otherwise fixed to the spool valve 333, the rack bar 393 having a rack 394 meshing with the pinion 392. Inasmuch as the valve hole 332 and the cylinder 342 in the actuator 30 are parallel to each other, the upper rack 394 extends parallel to the lower rack 382, so that the steering force applied from the outer shaft 321 to the spool valve 333 is detected as linear motion parallel to the central axis of the actuator 330. Any backlash between the rack 394 and the pinion 392 should be held to a minimum in order to transmit the steering force to the spool valve 333 highly sensitively.

With the power steering apparatus of the third embodiment, as described above, the actuator separate from the steering mechanism and the steering shaft are coupled to each other by the link mechanism which includes the rack on the actuator and the pinion on the steering shaft, the rack and the pinion being held in mesh with each other. Therefore the actuator can be moved along its central axis in response to linear motion of the rack meshing with the pinion on the steering shaft when the steering shaft is rotated in steering operation. The central axis of the actuator is prevented from being angularly moved, and the power assisting force is effectively utilized for allowing the handlebar to be turned with ease.

Figure 31:
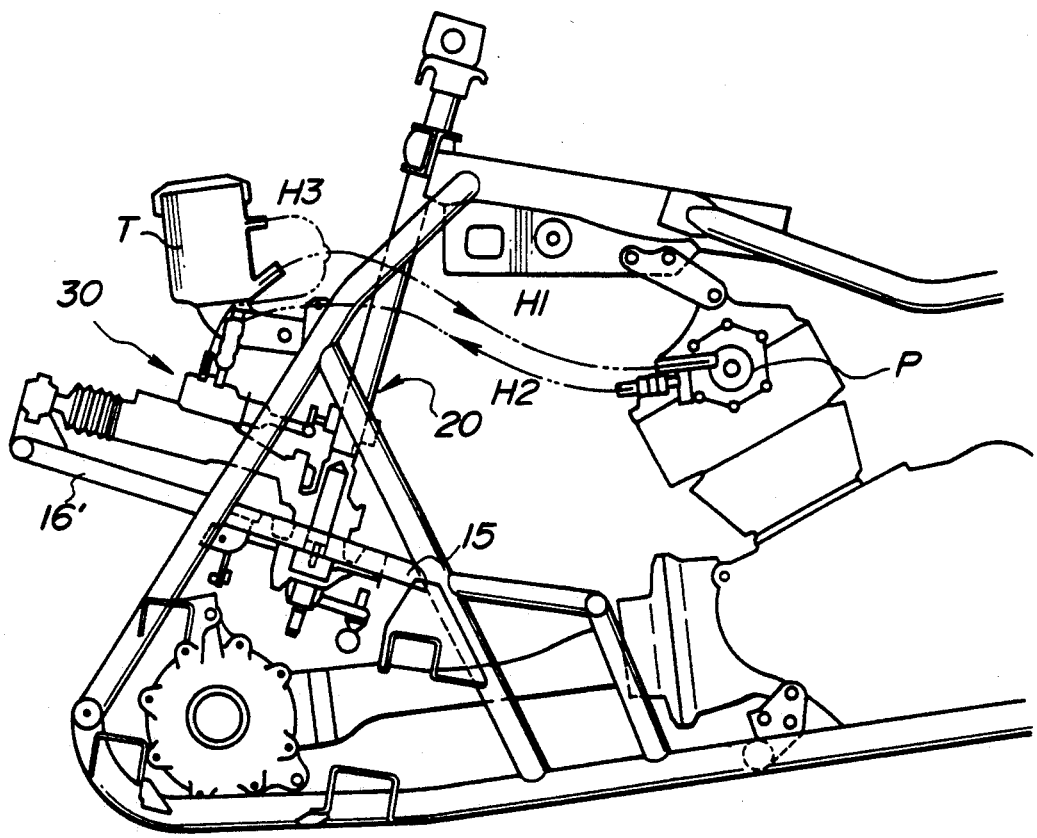
FIG. 31 is a fragmentary side elevational view of a front portion of the vehicle frame of a riding-type motor vehicle with an actuator disposed in front of a steering shaft.

In the aforesaid three embodiments, the power assisting actuator 30 shown in FIG. 3, for example, is disposed behind the steering shaft 20 and inclined slightly downwardly and rearwardly in the longitudinal direction of the motor vehicle. However, as shown in FIG. 31, one of the lower steering shaft supporting pipes 15 may extend forwardly and upwardly as an extension pipe 16' on which the actuator may be mounted. The extension pipe 16' may double as a protective member forwardly of the motor vehicle.

The ordinary trochoid pump may be employed to supply working oil to the actuator in each of the three embodiments. The conventional trochoid pump can discharge working oil at a rate proportional to the rotational speed of the engine. Since the actuator which is driven by the working oil is operable by working oil supplied at a certain rate, when the rate at which the working oil is discharged from the pump has reached a certain level, excessive working oil is returned from the return passage connected to an outlet passage to the tank, or is delivered directly from the outlet passage to an inlet passage, thus reducing the load on the engine and the power loss thereof.

With the trochoid pump being used, the power loss of the engine may be produced not only when the working oil is excessively discharged from the pump, but also when the engine is idling. If the power steering apparatus is operated while the engine is idling, the power loss of the engine is increased, and the idling engine speed is lowered. To avoid this, the idling engine speed is set to a high speed, resulting in poor fuel economy.

To allow the power steering apparatus to operate more efficiently when a trochoid pump is employed to supply working oil to operate the actuator, the trochoid pump used if the present invention is designed such that when the rate of working oil discharged from the pump is low at the time the engine is idling, the working oil is delivered directly from an outlet passage to an inlet passage to reduce the load and power loss of the engine during idling, and also to stabilize the idling engine speed.

A trochoid pump according to the present invention will be described below with reference to FIGS. 32 through 36.

Figure 32:
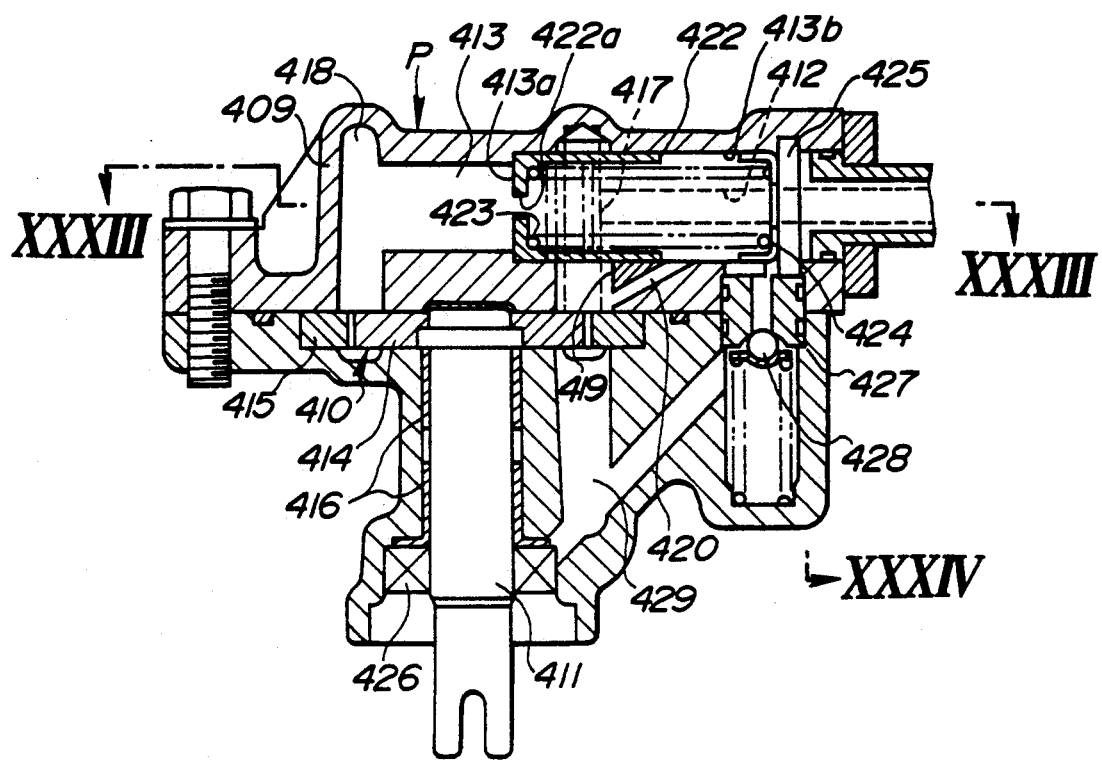
FIG. 32 is a vertical cross-sectional view of a trochoid pump according to the present invention.
Figure 34:
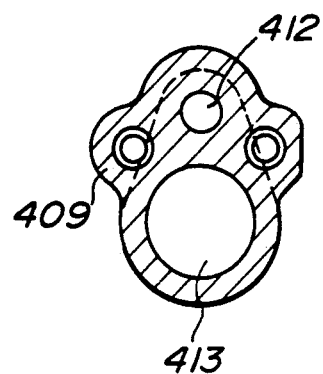
FIG. 34 is a cross-sectional view taken along line XXXIV—XXXIV of FIG. 32.

As shown in FIGS. 32 through 34, a pump P comprises a pump casing 409 which is separable into two casing members, a rotor 410 rotatable in the pump casing 409, a drive shaft 411 connected to the rotor 410, and an inlet passage 412 and an outlet passage 413 which are defined in the casing 409. With the pump P fixed to the cylinder head 1a of the engine as shown in FIG. 3, the rotor 410 is rotated by the drive shaft 411 coupled to the camshaft 1b to pump working oil.

The rotor 410 comprises an inner rotor 414 and an outer rotor 415. The inner rotor 414 is fixed to the drive shaft 411 which is rotatably supported in the pump casing 409 through two bearings 416. The outer rotor 415 is rotatably fitted in the pump casing 409. The inner rotor 414 has external teeth 414a which are held in mesh with internal teeth 415a of the outer rotor 415. The inner and outer rotors 414, 415 are rotated in one direction to continuously vary the space or volume defined between the teeth 414a, 415a to effect a pumping action.

The inlet passage 412 connected to the reservoir tank T through the suction hose H1 and the outlet passage 413 connected to the actuator through the feed hose H2 have an inlet port 417 and an outlet port 418, respectively, defined in the pump casing 409 in downstream and upstream positions, each of the inlet and outlet ports 417, 418 being of a crescent shape. The inlet and outlet passages 412, 413 open through the inlet and outlet ports 417, 418 into inlet and outlet sides of the rotor 410, thereby providing passages for introducing working oil into the rotor 410 and discharging working oil under pressure from the rotor 410. The outlet passage 413 has a downstream larger-diameter portion 413b with a step 413a at one end thereof.

The pump casing 409 has a return passage 419 and a circulatory passage 420 by which the outlet passage 413 and the inlet passage 412 communicate with each other. The return passage 419 has one and opening at the peripheral wall of an intermediate portion of the outlet passage 413 and the other end opening at the inlet port 417. The circulatory passage 420 has one end opening at the peripheral wall of the outlet passage 413 slightly downstream of the return passage 419. The circulatory passage 420 is smaller in diameter than the return passage 419 and is joined at the other end thereof to one side of the return passage 419 obliquely thereto. The outlet passage 413 houses therein a flow regulating valve 421 for opening and closing the return passage 419 and the circulatory passage 420.

The flow regulating valve 421 comprises a cylindrical valve member 422 having a small hole 22a in its upstream end, a coil spring 423 for normally urging the valve member 422 in a direction opposite to the direction of flow of working oil through the outlet passage 413, and a spring seat 424 supporting one end of the coil spring 423. The flow regulating valve 421 is inserted into the larger-diameter portion 413b of the outlet passage 413 from the downstream end thereof. The flow regulating valve 421 is retained in the pump casing 409 by a stopper pin 425 engaging the downstream end of the spring seat 424, and engages the step 413a of the larger-diameter portion 413b at the upstream end of the valve member 422. When the rate of working oil discharged from the pump P is low, the valve member 422 is held against the step 413a under the resiliency of the coil spring 423 against the pressure of the working oil applied to the upstream end of the valve member 422. The flow regulating valve 421 thus closes the return passage 419 and opens the circulatory passage 420, while guiding working oil having passed through the small hole 422a via the circulatory passage 420 into the inlet port 417. As the rate of working oil discharged is gradually increased, the pressure of the working oil overcomes the resiliency of the coil spring 423 to move the valve member 422 gradually downstream, thereby closing the circulatory passage 420 while keeping the return passage 419 closed. The entire working oil is now fed under pressure through the feed hose H2 to the power steering apparatus. When the rate of discharged working oil reaches a predetermined rate, the valve member 422 is moved further downstream to open the return passage 419 while keeping the circulatory passage 420 closed. A portion of the working oil is now guided through the return passage 419 into the inlet port 417, so that the working oil is fed at a certain rate to the power steering apparatus.

When the engine is idling, the return passage 419 is closed and the circulatory passage 420 is opened. As the engine speed increases, the return passage 419 is closed and the circulatory passage 20 closed. When the engine speed further increases and the power steering apparatus has maintained a required amount of working oil, the return passage 419 is opened and the circulatory passage 420 is closed. With the flow regulating valve 421 thus operated, the rate of working oil discharged from the pump P varies according to the discharge characteristics of the pump P from just above an engine idling speed m up to an engine speed n at which the required amount of working oil is maintained in the power steering apparatus, as indicated by the curve Q in FIG. 35. When the engine is idling, the rate of working oil discharged from the pump P to the power steering apparatus is zero, keeping the pump driving power minimum.

In FIG. 32, the drive shaft 411 is surrounded by an oil seal. A relief valve 427 includes a steel ball 428 which is pushed open by working oil when the pressure of the working oil discharged by the oil pump P exceeds a certain pressure level. The working oil is then allowed to flow from a relief passage 429 into the inlet passage 412. Therefore, the pressure of working oil discharged from the pump P is prevented from increasing beyond a predetermined pressure.

Figure 36:
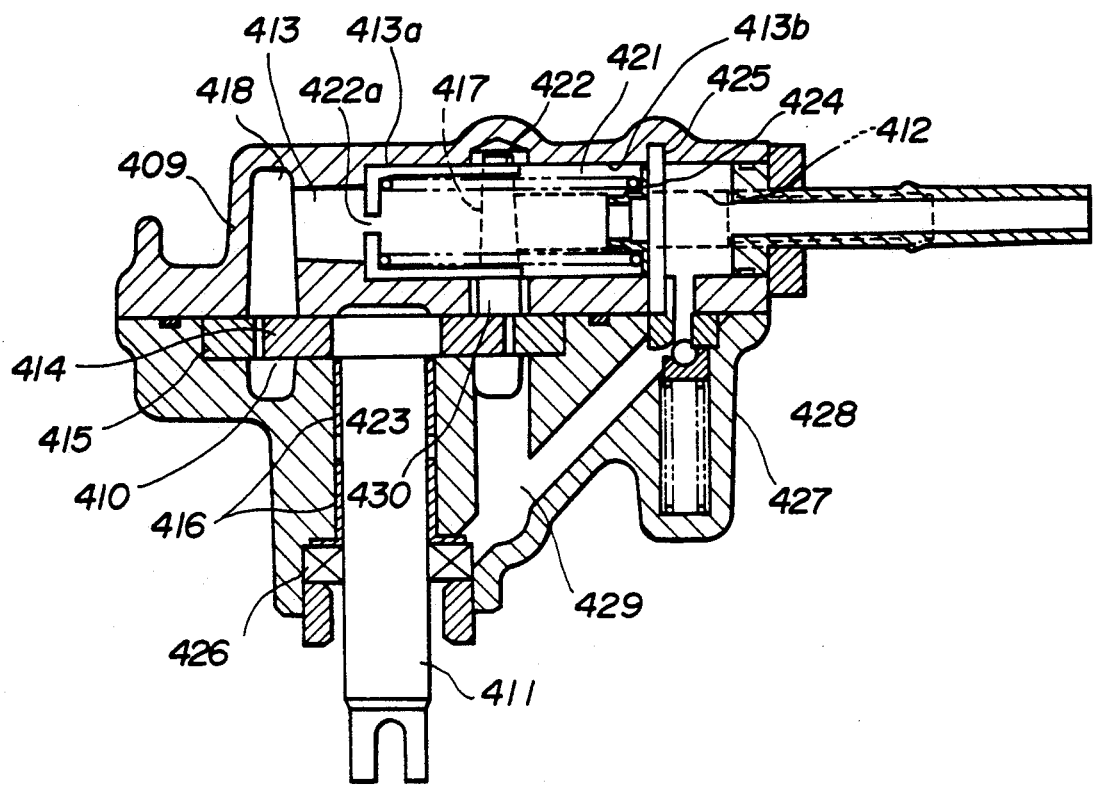
FIG. 36 is a vertical cross-sectional view of a modified trochoid pump.
Figure 35:
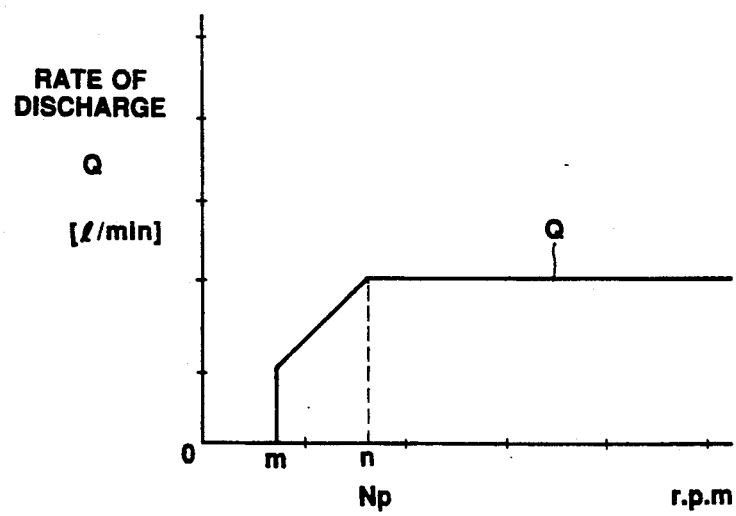
FIG. 35 is a graph showing the rate or pressure at which a fluid is discharged by the trochoid pump, as plotted against an engine rotational speed.

While the circulatory passage 420 is separate from the return passage 419 in FIG. 32, a bypass passage 430 doubling as both passages 419, 420 may be defined as shown in FIG. 36, and the length of the valve member 422 may be adjusted to an appropriate length to provide the function of the circulatory passage 420.

With the above arrangement of the present invention, as described above, the pump P has therein the circulatory passage interconnecting the inlet and outlet passages and the flow regulating valve for opening the circulatory passage when the rate of working oil discharged from the pump is low. When the rate of discharged working oil is low, the working oil is delivered from the outlet passage to the inlet passage through the circulatory passage, so that the power loss of the drive source or engine is reduced to reduce any energy loss, and the drive source is stably rotated.

Although there have been described what are at present considered to be the preferred embodiments of the present invention, it will be understood that the invention may be embodied in other specific forms without departing from the essential characteristics thereof. The present embodiment are therefore to be considered in all aspects as illustrative, and not restrictive. The scope of the invention is indicated by the appended claims rather than by the foregoing description.

We claim:

1. A power steering apparatus for a motor vehicle, comprising:
    a steering shaft having an axis, an upper portion on which a steering handle is mounted and a lower portion operatively coupled to a steerable wheel of the motor vehicle;
    phase difference generating means disposed between the upper and lower portions of said steering shaft and having a first action point for allowing a steering angular phase difference within a predetermined range between the wheel and the first action point;
    lever arm means angularly movable about the axis of said steering shaft and angularly displaceable therewith, said lever arm having a second action point; and
    actuator means operatively coupled between said first and second action points and comprising means for acting, by said lever arm means, on said steering shaft as a function of the angular displacement of said lever arm means for assisting in turning said steering shaft.
    said upper portion of said steering shaft including an upper shaft to which said steering handle is connected and which is rotatable with said steering handle,
    said lower portion of said steering shaft including a lower shaft operatively coupled to a steerable wheel of the motor vehicle,
    said phase difference generating means for interconnecting said upper and lower shafts while allowing the steering angular phase difference being responsive to the application of a steering force to said upper shaft;
    said lever arm means having an arm projecting laterally to said upper shaft and angularly displaceable therewith; and
    said actuator means comprising control valve means having a valve body angularly movable about a pivot on a vehicle frame of the motor vehicle, and a control valve pivotally mounted on a distal end of said arm and slidable in said valve body as a function of angular movement of said arm means for controlling an assisting force to be applied to said lower shaft.

2. A power steering apparatus according to claim 1, wherein said arm is connected to control said control valve means to gradually reduce the assisting force applied to said lower shaft in response to a reduction in said arm ratio as the steering angle through which the steering handle is turned is increased.

3. A power steering apparatus according to claim 1, wherein said lower shaft has a pinion on an outer periphery thereof;
    said actuator means further including power cylinder means having a rack meshing with said pinion for transmitting the assisting force to said lower shaft, said control valve means comprising means for controlling operation of said power cylinder means depending on the change in said arm ratio in response to angular movement of said arm.

4. A power steering apparatus for a motor vehicle, comprising:
    a steering shaft having an axis, an upper portion on which a steering handle is mounted and a lower portion operatively coupled to a steerable wheel of the motor vehicle;
    phase difference generating means disposed between the upper and lower portions of said steering shaft and having a first action point for allowing a steering angular phase difference within a predetermined range between the wheel and the first action point;
    lever arm means angularly movable about the axis of said steering shaft and angularly displaceable therewith, said lever arm having a second action point; and
    actuator means operatively coupled between said first and second action points and comprising means for acting, by said lever arm means, on said steering shaft as a function of the angular displacement of said lever arm means for assisting in turning said steering shaft,
    said upper portion of said steering shaft including an upper shaft to which said steering handle is connected and which is rotatable with said steering handle,
    said lower portion of said steering shaft including a lower shaft operatively coupled to a steerable wheel of the motor vehicle,
    said phase difference generating means for interconnecting said upper and lower shafts while allowing the steering angular phase difference being responsive to the application of a steering force to said upper shaft;

said lever arm means having an arm projecting laterally from said lower shaft and angularly displaceable therewith; and said actuator means comprising power cylinder means having a cylinder body angularly movable about one end thereof which is pivotally coupled to a distal end of said arm, and a piston rod having a distal end pivotally coupled to a vehicle frame of the motor vehicle, for urging said cylinder body to apply an assisting force to said lower shaft depending on the angular displacement of said arm.

5. A power steering apparatus according to claim 4, wherein said power cylinder means comprises means for gradually reducing the assisting force applied to said lower shaft in response to an increase in the steering angle through which the steering handle is turned.

6. A power steering apparatus for a motor vehicle, comprising:

a steering shaft having an axis, an upper portion on which a steering handle is mounted and a lower portion operatively coupled to a steerable wheel of the motor vehicle;

phase difference generating means disposed between the upper and lower portions of said steering shaft and having a first action point for allowing a steering angular phase difference within a predetermined range between the wheel and the first action point;

lever arm means angularly movable about the axis of said steering shaft and angularly displaceable therewith, said lever arm having a second action point; and actuator means operatively coupled between said first and second action points and comprising means for acting, by said lever arm means, on said steering shaft as a function of the angular displacement of said lever arm means for assisting in turning said steering shaft, said upper portion of said steering shaft including an upper shaft to which said steering handle is connected and which is rotatable with said steering handle, said lower portion of said steering shaft including a lower shaft operatively coupled to a steerable wheel of the motor vehicle, said phase difference generating means for interconnecting said upper and lower shafts while allowing the steering angular phase difference being responsive to the application of a steering force to said upper shaft;

said lever arm means including a first arm projecting laterally from said upper shaft and angularly displaceable therewith, and a second arm projecting laterally from said lower shaft and angularly displaceable therewith;

said actuator means comprising power cylinder means having a cylinder body angularly movable about one end thereof which is pivotally coupled to a distal end of said arm, and a piston rod having a distal end pivotally coupled to a vehicle frame of the motor vehicle, for urging said cylinder body to apply an assisting force to said lower shaft as a function of the angular displacement of said second arm, and control valve means having a valve body coupled to said cylinder body, and a control valve pivotally mounted on a distal end of said first arm and slidable in said valve body as a function of the angular displacement of said first arm for controlling said power cylinder means.

7. A power steering apparatus according to claim 6, wherein said valve body and said cylinder body are integrally joined to each other.

8. A power steering apparatus for a motor vehicle, comprising:

a steering shaft having an axis, an upper portion on which a steering handle is mounted and a lower portion operatively coupled to a steerable wheel of the motor vehicle;

phase difference generating means disposed between the upper and lower portions of said steering shaft, said phase difference generating means comprising a first twistable member coupled between said steering handle and said lower portion, and a second member that is angularly displaceable with said steering handle, said phase difference generating means having a first action point coupled to said second member for allowing a steering angular phase difference within a predetermined range between the wheel and the first action point;

lever arm means coupled to said lower portion to be angularly movable about the axis of said steering shaft and angularly displaceable therewith, said lever arm having a second action point; and actuator means operatively coupled between said first and second action points and comprising means for acting, by said lever arm means, on said steering shaft as a function of the angular displacement of said lever arm means for assisting in turning said steering shaft, wherein said actuator means comprises a hydraulically operated actuator, further including a trochoid pump actuatable by an engine of the motor vehicle for supplying working oil to said hydraulically operated actuator;

said trochoid pump comprising:

a pump casing;

a rotor rotatably disposed in said pump casing;

said pump casing having an inlet passage and an outlet passage which open toward said rotor, said rotor being rotatable for pumping working oil from said inlet passage to said outlet passage;

said pump casing further having a circulatory passage by which said inlet and outlet passages communicate with each other, and a flow regulating valve disposed in said outlet passage for opening said circulatory passage when the rate of flow of the working oil in said outlet passage is smaller than a predetermined level.

9. A power steering apparatus for a motor vehicle, comprising:

a steering shaft including an input shaft for receiving a steering force and an output shaft coupled to a steerable wheel of the motor vehicle;

phase difference generating means for interconnecting said input and output shafts while allowing an angular phase difference within a predetermined range between said input and output shafts depending on a steering force applied to said input shaft; and actuator means comprising a body angularly movably connected to said output shaft through a first junction and having first and second cylinders having respective parallel axes, a rod pivotally coupled to a vehicle frame of the motor vehicle by a pivot, a piston coupled to said rod and slidably fitted in said first cylinder for urging said body against said pivot, and a control valve coupled to said input shaft through a second junction and slidably movable in said second cylinder over a distance corresponding to said phase difference for controlling the urging of said body by said piston.

10. A power steering apparatus according to claim 9, further including lever arm means including a first arm projecting laterally from said output shaft, said body being pivotally coupled to said first arm through a first pivot shaft serving as said first junction, and a second arm projecting laterally from said input shaft, said control valve being pivotally coupled to said second arm through a second pivot shaft serving as said second junction, said first and second pivot shafts being held in line with each other at least when said steering shaft is in a neutral position.

11. A power steering apparatus according to claim 10 wherein said control valve comprises means for controlling the urging of said body by said piston to bring said first pivot shaft into coaxial alignment with said second pivot shaft.

12. A power steering apparatus according to claim 9, wherein said phase difference generating means comprises:
a first pin disposed on the outer periphery of said input shaft and extending parallel to the axis of said input shaft;
a second pin disposed on the outer periphery of said output shaft and extending parallel to the axis of said output shaft, said second pin being coaxial with said first pin when the steering shaft is in the neutral position; and
urging means for urging said first and second pins so as to circumferentially grip the first and second pins under a preset load for preventing said first and second pins from being shifted out of coaxial relation with each other when the steering force applied to said input shaft is smaller than a predetermined level.

13. A power steering apparatus according to claim 9, wherein said output shaft has a first pinion on the outer periphery thereof, said body having a first rack meshing with said first pinion and extending parallel to the axis of said body to provide said first junction.

14. A power steering apparatus according to claim 13, wherein said input shaft has a second pinion on the outer periphery thereof, said control valve having a second rack meshing with said second pinion and extending parallel to the axis of said body to provide said second junction.

15. A power steering apparatus according to claim 13, further including bearing means for urging said rack toward the axis of said output shaft to hold said first pinion and said first rack in mesh with each other.

* * * * *